United States Patent
Clauer et al.

(10) Patent No.: US 6,875,953 B2
(45) Date of Patent: Apr. 5, 2005

(54) METHOD USING LASER SHOCK PROCESSING TO PROVIDE IMPROVED RESIDUAL STRESS PROFILE CHARACTERISTICS

(75) Inventors: Allan H. Clauer, Worthington, OH (US); David F. Lahrman, Powell, OH (US); Jeff L. Dulaney, Delaware, OH (US); Steven M. Toller, Dublin, OH (US)

(73) Assignee: LSP Technologies, Inc., Dublin, OH (US)

( * ) Notice: Subject to any disclaimer, the term of this patent is extended or adjusted under 35 U.S.C. 154(b) by 33 days.

(21) Appl. No.: 10/662,802

(22) Filed: Sep. 12, 2003

(65) Prior Publication Data

US 2004/0238509 A1 Dec. 2, 2004

Related U.S. Application Data

(62) Division of application No. 10/207,560, filed on Jul. 29, 2002, now Pat. No. 6,664,506.

(51) Int. Cl.$^7$ .............................................. B23K 26/00
(52) U.S. Cl. ................................................ 219/121.85
(58) Field of Search ..................... 219/121.6, 121.61, 219/121.62, 121.76, 121.77, 121.78, 121.81, 121.83, 121.85; 72/53, 54; 29/90.7, 527.1, 557

(56) References Cited

U.S. PATENT DOCUMENTS

| | | | |
|---|---|---|---|
| 5,591,009 A | 1/1994 | Mannava et al. | |
| 6,005,219 A | * 12/1999 | Rockstroh et al. | ..... 219/121.85 |
| 6,469,275 B2 | 10/2002 | Dulaney et al. | |
| 6,483,076 B1 | 11/2002 | O'Loughlin et al. | |
| 6,551,064 B1 | 4/2003 | Mannava et al. | |

FOREIGN PATENT DOCUMENTS

EP    1 122 321 A2    8/2001    ........... C21D/10/00

OTHER PUBLICATIONS

International Journal of Rock Mechanics and Mining Sciences. Laser–induced shock wave generation and shock wave enhancement in basalt; C.S. Montross, V. Florea, J.A. Bolger; Redstone Mining P/L Artarmon, New South Wales, 2064 Australia.

* cited by examiner

Primary Examiner—Samuel M. Heinrich
(74) Attorney, Agent, or Firm—Randall J. Knuth

(57) ABSTRACT

Various laser shock processing methods are provided to establish selective compressive residual stress distribution profiles within a workpiece. An asymmetrical stress distribution profile may be formed through the thickness of a thin section of a gas turbine engine airfoil. One method involves simultaneously irradiating a workpiece with a set of laser beams to form a corresponding set of adjacent non-overlapping laser shock peened surfaces, enabling the shockwaves to encounter one another. Additionally, opposite sides of the workpiece may be irradiated at different times to form opposing laser shock peened surfaces, enabling the shockwaves to meet at a location apart from the mid-plane. Furthermore, opposite sides of the workpiece may be irradiated simultaneously using laser beams having different pulse lengths to form opposing laser shock peened surfaces. Moreover, opposite sides of the workpiece may be irradiated simultaneously to form a set of laterally offset laser shock peened surfaces.

30 Claims, 17 Drawing Sheets

METHOD USING LASER SHOCK PROCESSING TO PROVIDE IMPROVED RESIDUAL STRESS PROFILE CHARACTERISTICS

CONTINUATION DATA

The present application is a divisional application and hereby claims the benefit under Title 35, United States Code, §120, of U.S. patent application Ser. No. 10/207,560 filed on Jul. 29, 2002 now U.S. Pat. No. 6,664,506.

BACKGROUND OF THE INVENTION

1. Field of the Invention

The present invention relates generally to laser shock peening techniques, and, more particularly, to processing methods employing various laser shock peening procedures to enhance the deep compressive residual stress characteristics induced by laser shock peening and to selectively modify in a controlled manner the compressive residual stress distribution profile developed in a processed workpiece, such as an airfoil.

2. Description of the Related Art

Laser shock processing has found use in applications involving the enhancement of certain structural features such as the leading and trailing edges of turbine engine compressor or other airfoils. Various strategies have focused upon finding adequate laser beam spot patterns to process the airfoil. However, little attention has been given to determining useful techniques that can provide desired shockwave groups and accompanying stress distribution profiles.

In a typical application, when a shockwave from a single laser irradiated spot on the surface of a material propagates into the material from the surface, the peak pressure is highest at the surface and then decreases (i.e., attenuates) with increasing depth into the material. If the peak pressure is high enough, namely, above the dynamic yield strength of the workpiece, the shockwave plastically deforms the material below the surface in an amount generally proportionate to the amount that the peak pressure is above the dynamic yield strength.

The plastic yielding gives rise to plastic strain in the material, which creates the compressive residual stresses desired by the process. As the peak pressure of the shockwave decreases with increasing depth below the surface, the amount of plastic strain also decreases. This factor limits the depth of the compressive residual stress that can be introduced into the workpiece.

SUMMARY OF THE INVENTION

Various processing methods are provided that employ laser shock peening procedures to enhance the deep compressive residual stress characteristics induced within a workpiece by laser shock peening, such as with the introduction of an asymmetrical or other selectively configured compressive residual stress distribution profile within the workpiece. One operation may involve processing an airfoil to develop an asymmetrical stress distribution profile through the thickness dimension of a thin section of the airfoil. The asymmetrical stress distribution profile will be selectively tailored to produce compressive residual stress properties within the airfoil that have desired behaviors and objectives, such as retarding crack propagation, inhibiting the growth of incipient flaws, strengthening the material at high fatigue locations, increasing the high cycle fatigue strength at specific location, providing a desired shape or curvature, and other such uses as typically understood in the art.

According to one processing method, the workpiece is simultaneously irradiated with a set of laser beams to form a corresponding set of adjacent non-overlapping laser shock peened surfaces. The spaced-apart relationship between the laser beam spots is chosen such that the respective shockwaves induced by laser shock peening will encounter one another as they propagate through the workpiece. The shockwaves will intersect at a location disposed generally between the laser shock peened surfaces.

In one form, the encountering shockwaves will interact in a manner generally exhibiting a constructive interference effect. In this manner, the respective deep compressive residual stress regions that extend from each of the adjacent non-overlapping laser shock peened surfaces will overlap and significantly increase the peak pressure experienced by the material in the vicinity of the shockwave intersection plane. Various laser spot beam patterns may be developed to produce selective arrangements of shockwave interaction locations.

According to another method, the workpiece is irradiated at opposing sides thereof at different times to form opposing laser shock peened surfaces. In this manner, the opposing time-staggered shockwaves induced by laser shock peening will meet at a location apart from a mid-plane of the workpiece, producing an asymmetrical compressive residual stress profile through a thickness dimension of the workpiece. The relative difference between the arrival times of the laser beams used to laser shock peen the opposing sides of the workpiece is chosen to facilitate control of the profile characteristics by selectively determining the interior location where the opposing shockwaves will encounter one another.

According to another processing method, the workpiece is irradiated simultaneously at opposing sides thereof using laser beams having different pulse lengths to form opposing laser shock peened surfaces. The use of such differential laser beam pulse lengths results in the development of opposing shockwaves induced by laser shock peening that attenuate at different rates as they propagate through the workpiece. This disparate attenuation in the shockwaves will produce compressive residual stress regions extending from the respective laser shock peened surfaces having a stress distribution profile that exhibits an asymmetry along a thickness dimension of the workpiece.

According to another processing method, the workpiece is irradiated simultaneously at opposing sides thereof to form a set of laterally offset laser shock peened surfaces. This lateral offset has the effect of creating an imbalance in the forces that are developed within the workpiece as the shockwaves induced by laser shock peening propagate through the workpiece. This force imbalance exerts a moment force on the material, tending to rotate it around an axis perpendicular to the displacement vector connecting the laterally offset laser shock peened surfaces, and lying in the nominal mid-thickness phase between the opposing laser-peened surfaces.

Additionally, the oppositely-directed shockwaves will interact in a generally asymmetrical manner relative to a mid-plane of the workpiece, producing a shockwave interaction zone generally centered about the mid-plane but exhibiting wing-type portions that extend toward opposite ones of the workpiece surfaces in an oblique manner relative to the mid-plane. A corresponding asymmetrical stress distribution profile will accompany this particular form of shockwave interaction associated with the simultaneous formation of laterally offset laser shock peened surfaces disposed at opposing sides of the workpiece.

The invention, in one form thereof, is directed to a method that involves laser shock peening an object to form at least one set of at least two simultaneously formed, non-overlapping adjacent laser shock peened surfaces.

In one form, the laser shock peening step further includes the step of forming a selective laser beam spot pattern on the object which is sufficient to enable the formation of at least two overlapping regions each having compressive residual stresses imparted by laser shock peening, wherein each region extends into the object from a respective laser shock peened surface.

In another form, the laser shock peening step further includes the step of forming a selective laser beam spot pattern on the object which is sufficient to enable at least two respective shockwaves induced by laser shock peening in connection with the simultaneous formation of at least two respective non-overlapping adjacent laser shock peened surfaces to encounter one another within the object.

In another form, the laser shock peening step further includes the step of forming a selective laser beam spot pattern on the object, which is configured to effectuate the formation of at least one row of spaced-apart shockwave intersection sites in the object, wherein each shockwave intersection site is defined by an encounter between shockwaves induced by laser shock peening traveling from neighboring spaced-apart laser beam spots.

In another form, the laser shock peening step includes comprises the step of forming a selective laser beam spot pattern on the object including at least one row of laser beam spots arranged in spaced-apart overlapping pairs. The spatial relationship between adjacent pairs is sufficient to enable the formation of a shockwave intersection site disposed at least in part therebetween, wherein each shockwave intersection site is defined by an encounter between shockwaves induced by laser shock peening traveling from nearest neighbor laser beam spots of adjacent laser beam spot pairs.

In another form, the laser shock peening step further includes the step of forming a selective laser beam spot pattern on the object including at least one row of non-overlapping laser beam spots configured to define a selective pattern of shockwave intersection sites. Each shockwave intersection site is defined by an encounter between shockwaves induced by laser shock peening traveling from neighboring laser beam spots.

In another form, the laser shock peening step further includes the step of forming a selective laser beam spot pattern on the object including at least one row of overlapping laser beam spots, wherein the spot pattern is configured to effectuate the formation of at least one row of spaced-apart shockwave intersection sites in the object. Each row of shockwave intersection sites is generally disposed between respective adjacent ones of the laser beam spot rows, while each shockwave intersection site is defined by an encounter between shockwaves induced by laser shock peening traveling from laser beam spots of adjacent rows.

In another form, the laser shock peening step further includes the step of sequentially forming at least one selective laser beam spot pattern on the object, wherein each pattern is configured to effectuate the formation of at least one row of spaced-apart shockwave intersection sites in the object. Each shockwave intersection site is defined by an encounter between shockwaves induced by laser shock peening traveling from neighboring laser beam spots. Preferably, each row of spaced-apart shockwave intersection sites associated with a respective laser beam spot pattern has a respective orientation characteristic defining a directional orientation of the shockwave intersection sites associated therewith.

The object preferably includes a gas turbine engine component such as an airfoil.

The invention, in another form thereof, is directed to a method that involves laser shock peening an object to form at least one set of at least two non-overlapping adjacent laser shock peened surfaces simultaneously formed with one another. Each laser shock peened surface is associated with a respective shockwave induced by laser shock peening. Moreover, the respective shockwaves which are associated with at least one selective set of at least two simultaneously formed, non-overlapping adjacent laser shock peened surfaces encounter one another within the object.

The invention, in another form thereof, is directed to a method that involves simultaneously laser shock peening an object at a plurality of locations to form at least one pair of adjacent, spaced-apart laser shock peened surfaces on the object and to induce the generation of a respective shockwave in association with the formation of each laser shock peened surface. The respective spaced-apart relationship between the respective laser shock peened surfaces of at least one respective laser shock peened surface pair is sufficient to enable the respective shockwaves associated therewith to encounter one another within the object.

The invention, in another form thereof, is directed to a method that involves laser shock peening an object to form at least one set of at least two simultaneously formed, spaced-apart adjacent laser shock peened surfaces. Each laser shock peened surface is associated with a region of compressive residual stresses extending into the object therefrom and imparted by laser shock peening. The laser shock peening operation is configured to enable the formation of at least one region overlap location, wherein each region overlap location defines a respective overlap of at least two respective compressive residual stress regions respectively associated with at least two corresponding simultaneously formed, spaced-apart adjacent laser shock peened surfaces.

The configuration step further includes the step of selecting a predetermined spaced-apart relationship for use in forming neighboring ones of the laser shock peened surfaces.

The invention, in another form thereof, is directed to a method that involves providing a laser shock processor; and operating the laser shock processor to laser shock process the object in a manner sufficient to cause at least one set of at least two shockwaves having mutually non-interfering initial wavefronts to develop simultaneously at a selective side of the object and subsequently interact with one another within the object.

In one form, the laser shock processor is operated to simultaneously form two spaced-apart laser shock processed surfaces on the object.

The invention, in another form thereof, is directed to a method for use with an object having a first side and a second side disposed generally opposite one another. The method involves laser shock peening the object to form at least one set of an associated first laser shock peened surface and a second laser shock peened surface on the first side and the second side of the object, respectively. The associated first and second laser shock peened surfaces of each respective set of laser shock peened surfaces are formed at different times. Preferably occurring between 1 nanosecond and 2000 nanoseconds apart in time.

In a preferred form, the associated first and second laser shock peened surfaces of at least one respective set of laser shock peened surfaces are disposed generally opposite one another.

The invention, in another form thereof, is directed to a method for use with an object having a first side and a second side disposed generally opposite one another. The method involves forming at least one pair of associated laser shock peened surfaces each disposed at a different one of the first and second sides of the object. Each pair of associated laser shock peened surfaces is formed by laser shock peening the object at the first and second sides thereof at different times.

The invention, in another form thereof, is directed to a method for use with an object having a first side and a second side disposed generally opposite one another. The method involves operating a laser shock processor to laser shock process the object in a manner sufficient to cause at least one set of generally opposing shockwaves to develop in a time-staggered relationship to one another at different ones of the first and second sides of the object.

In a preferred form, the laser shock processor is operated to form a first laser shock peened surface on one of the first and second sides of the object; and form a second laser shock peened surface on the other of the first and second sides of the object, at a time later than the formation of the first laser shock peened surface.

The invention, in another form thereof, is directed to a method for use with an object having a first side and a second side disposed generally opposite one another. The method involves operating a laser shock processor to laser shock process the object in a manner sufficient to cause at least one set of generally opposing shockwaves to develop at different times at different ones of the first and second sides of the object and to subsequently encounter one another within the object at a location apart from a midplane of the object.

In a preferred form, the laser shock processor is operated to laser shock peen the object at the first and second sides thereof at different times to form generally opposing laser shock peened surfaces.

The invention, in another form thereof, is directed to a method for use with an object having a first side and a second side disposed generally opposite one another. The method involves operating a laser shock processor to laser shock process the object in a manner sufficient to cause the formation of at least one set of generally opposing regions each extending from respective laser shock peened surfaces formed at different times at different ones of the first and second sides of the object. Each region has compressive residual stresses imparted by laser shock processing. Furthermore, each set of opposing regions defines an asymmetrical compressive residual stress distribution profile appearing generally along a respective thickness dimension of the object.

The invention, in another form thereof, is directed to a method for use with an object having a first side and a second side disposed generally opposite one another. The method involves simultaneously laser shock peening the object at the first and second sides thereof using laser beams having different pulse lengths to respectively form first and second laser shock peened surfaces on the first and second sides of the object, respectively.

In a preferred form, the first and second laser shock peened surfaces are disposed generally opposite one another.

The invention, in another form thereof, is directed to a method for use with an object having a first side and a second side disposed generally opposite one another. The method involves laser shock peening the object to form at least one set of simultaneously formed laser shock peened surfaces each disposed at a different one of the first and second sides of the object. The respective laser shock peened surfaces of at least one respective set of simultaneously formed laser shock peened surfaces are respectively formed using laser beams having different pulse lengths.

The invention, in another form thereof, is directed to a method for use with an object having a first side and a second side disposed generally opposite one another. The method involves operating a laser shock processor to laser shock process the object in a manner sufficient to cause at least one set of generally opposing shockwaves to develop simultaneously at different ones of the first and second sides of the object and to subsequently experience different rates of attenuation during propagation within the object.

In a preferred form, the laser shock processor is operated to simultaneously laser shock peen the object at the first and second sides thereof with laser beams having different pulse lengths.

The invention, in another form thereof, is directed to a method for use with an object having a first side and a second side disposed generally opposite one another. The method involves laser shock peening the object to form a plurality of laser shock peened surfaces. The plurality of laser shock peened surfaces includes at least one set of laterally offset, simultaneously formed laser shock peened surfaces each disposed at a different one of the first and second sides of the object.

In a preferred form, the lateral offset relationship is sufficient to enable associated shockwaves induced by laser shock peening to encounter one another within the object.

The invention, in another form thereof, is directed to a method for use with an object having a first side and a second side disposed generally opposite one another. The method involves laser shock peening the object to form a plurality of laser shock peened surfaces. The plurality of laser shock peened surfaces includes at least one set of laterally offset, simultaneously formed laser shock peened surfaces each disposed at a different one of the first and second sides of the object. Each laser shock peened surface is associated with a respective shockwave induced by laser shock peening. Additionally, the respective shockwaves which are associated with at least one selective set of laterally offset, simultaneously formed laser shock peened surfaces encounter one another within the object.

The invention, in another form thereof, is directed to a method for use with an object having a first side and a second side generally opposing one another. The method involves operating a laser shock processor to laser shock process the object in a manner sufficient to cause at least one set of laterally offset shockwaves to develop simultaneously at different ones of the first and second sides of the object and subsequently interact with one another within the object.

In one form, the laser shock processor is operated to simultaneously form a set of laterally offset laser shock processed surfaces on different ones of the first and second sides of the object.

The invention, in another form thereof, is directed to a method for use with an object having a first side and a second side disposed generally opposite one another. The method involves simultaneously laser shock peening the object at the first and second sides thereof to form first and second laser shock peened surfaces at the first and second sides of the object, respectively, wherein the first and second laser shock peened surfaces have a lateral displacement therebetween.

The invention, in another form thereof, is directed to a method for use with an object having a first side and a second side generally opposing one another. The method involves operating a laser shock processing apparatus to laser shock process the object in a manner sufficient to produce at least one zone of compressive residual stress in the object that is characterized by an asymmetrical stress distribution profile relative to a reference plane.

In one form, the laser shock processing apparatus is operated to laser shock peen the object at the first and second sides thereof at different times to form opposing first and second laser shock peened surfaces disposed at the first and second sides of the object, respectively.

In another form, the laser shock processing apparatus is operated to simultaneously laser shock peening the object at the first and second sides thereof using laser beams having different pulse lengths to form opposing first and second laser shock peened surfaces disposed at the first and second sides of the object, respectively.

In another form, the laser shock processing apparatus is operated to simultaneously laser shock peening the object at the first and second sides thereof to form laterally offset first and second laser shock peened surfaces disposed at the first and second sides of the object, respectively.

The invention, in another form thereof, is directed to a method for use with an object having a first side and a second side generally opposing one another. The method involves causing the formation in the object of at least one asymmetrical compressive residual stress distribution profile imparted by suitable laser shock processing of the object. Each asymmetrical compressive residual stress distribution profile appears generally along a respective thickness dimension of the object.

In one form, the object is laser shock peened at the first and second sides thereof at different times to form opposing first and second laser shock peened surfaces disposed at the first and second sides of the object, respectively.

In another form, the object is simultaneously laser shock peened at the first and second sides thereof using laser beams having different pulse lengths to form opposing first and second laser shock peened surfaces disposed at the first and second sides of the object, respectively.

In another form, the object is simultaneously laser shock peened at the first and second sides thereof to form laterally offset first and second laser shock peened surfaces disposed at the first and second sides of the object, respectively.

One advantage of the invention is that the laser shock peening process can increase the penetration depth of compressive residual stress formed below a laser shock peened surface beyond that available from a single pulse.

Another advantage of the invention is that the laser shock peening process can be used to tailor the sub-surface residual stress profile developed through the thickness of a thin section.

Another advantage of the invention is that asymmetry can be introduced into the stress distribution profile by simultaneously laser shock peening both sides of the thin section in the manner described herein, thereby allowing modification of the profile.

Another advantage of the invention is the availability of better control of the depth of the residual stress below the laser shock peened surface, and the intensity of the interaction of the shockwaves at mid-thickness of the thin section.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

According to the present invention, various laser shock processing methods are provided to establish selective compressive residual stress distribution profiles within a workpiece. For example, an asymmetrical stress distribution profile may be formed through the thickness of a thin section of a gas turbine engine airfoil.

According to one embodiment of the present invention discussed in relation to FIGS. 1–7, a laser shock processing method involves simultaneously irradiating a workpiece with a set of laser beams to form a corresponding set of adjacent non-overlapping laser shock peened surfaces, enabling the shockwaves to encounter one another. Simultaneous as used in the present application means either pulses created from the same initial laser oscillator or shockwaves formed in the workpiece within $5 \times 10^{-9}$ sec, therefore, effectively simultaneous as seen by the workpiece.

In another embodiment discussed in relation to FIGS. 8–9, opposite sides of the workpiece may be irradiated at different times to form opposing laser shock peened surfaces, enabling the shockwaves to meet at a location apart from the mid-plane.

In another embodiment discussed in relation to FIG. 10, opposite sides of the workpiece may be irradiated simultaneously using laser beams having different pulse lengths to form opposing laser shock peened surfaces. The resulting shockwaves experience different rates of attenuation within the workpiece, producing regions of compressive residual stress having different stress gradient profiles.

Figure 11A:
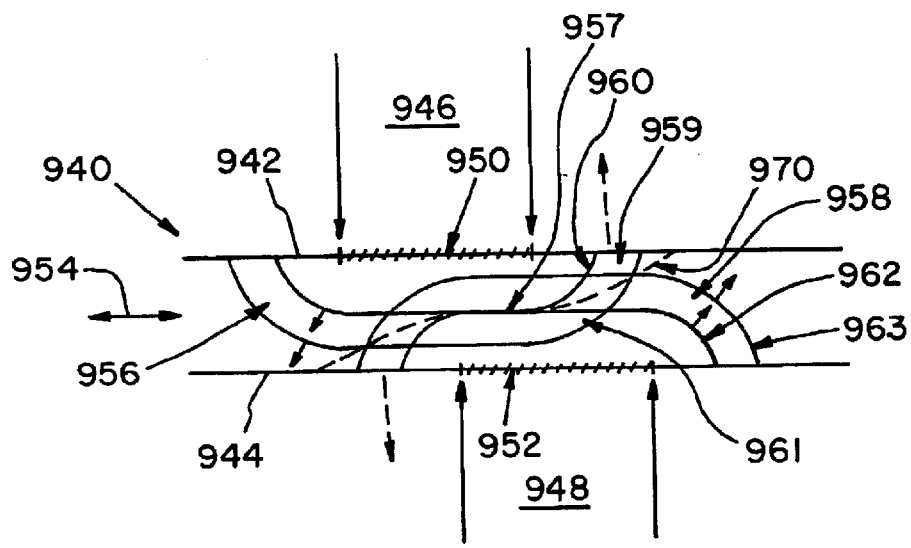
FIGS. 11A–C illustrate various cross-sectional views of a workpiece section that is laser shock peened using different amounts of lateral offset between the dual-sided laser shock peened surfaces, according to a fourth embodiment of the present invention.
Figure 11B:
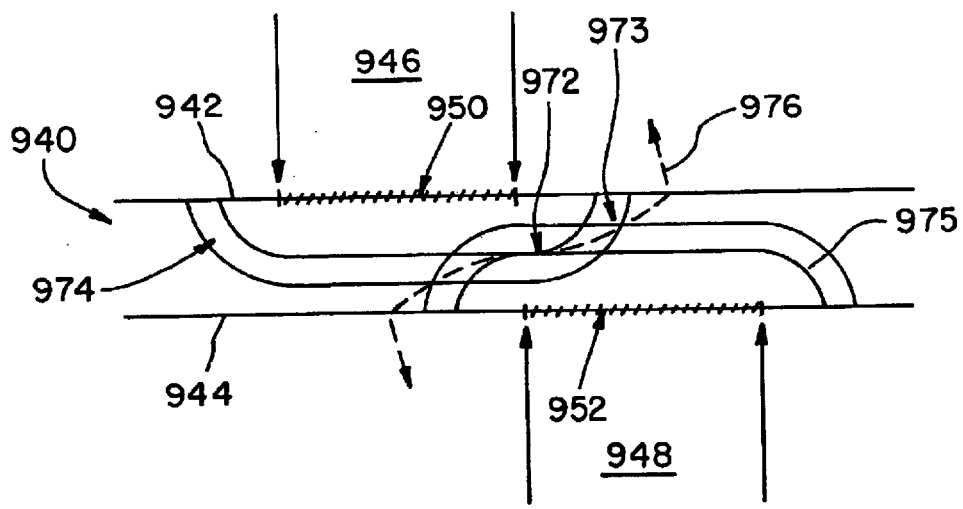
Figure 11C:
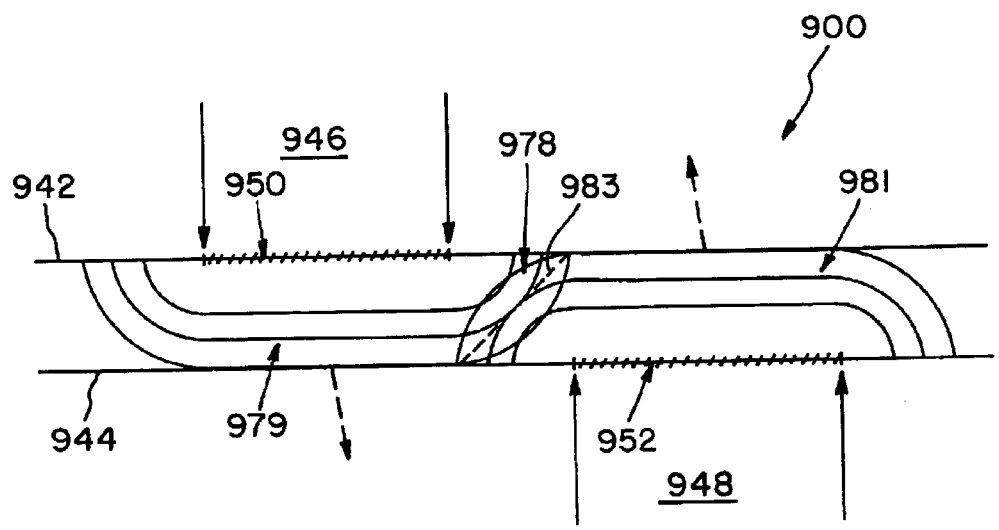
Figure 12:
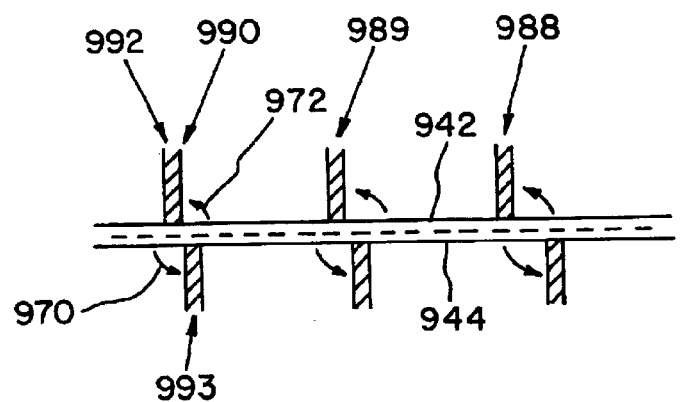
FIG. 12 is a schematic illustration of a dual-sided laser beam peening arrangement to depict the bending moments produced by the laser shock processing conducted in connection with FIGS. 11A–C.

In another embodiment discussed in relation to FIGS. 11–12, opposite sides of the workpiece may be irradiated simultaneously to form a set of laterally offset laser shock peened surfaces. The resulting shockwaves have a relative displacement therebetween, i.e., the shockwaves are not directly fully opposed to one another.

The force imbalance produced by the offset shockwaves exerts a localized moment influence on the workpiece tending to rotate it around an axis perpendicular to the displacement vector defined by the lateral offset, allowing geometric features such as deformations, curvatures, and bends to be introduced into the workpiece interaction zone. Also, the shockwave interaction zone includes portions having an orientation that are not parallel to the workpiece surfaces, i.e., an oblique shockwave interaction area having a directionality that is angled relative to a mid-plane of the workpiece.

Before proceeding with the details of the invention, a discussion is first provided concerning laser shock processing and the workpieces that may be treated by such processing methods.

By way of background, laser shock processing or laser shock peening refers to a process for producing a region having deep compressive residual stresses which are introduced by the influence of traveling pressure or shockwaves induced by laser shock peening a surface area of the workpiece. In preferred forms, the laser shock peening operation will produce a plurality of regions having deep compressive residual stresses imparted by laser shock peening and extending into the workpiece from respective laser shock peened surface areas.

Laser beams generated by a laser beam source are directed to impact the workpiece and thereby generates an exploding high pressure plasma caused by instantaneous ablation or vaporization of a painted, coated, or un-coated surface, which produces a strong localized compressive force applied to the workpiece. The shockwaves produced in connection with such ablation effectively provide a form of cold work hardening that creates compressive residual stresses extending into the solid body. These residual compressive stresses foster an increase in fatigue properties of the part and alleviate and/or counteract the presence of other weaknesses such as crack fronts and tensile fields.

In one typical form, laser peening employs an opaque overlay applied to the surface of the workpiece and a transparent overlay applied to the opaque overlay. The opaque overlay may include materials such as an oil-based or acrylic-based black paint, while the transparent overlay may include materials such as a curtain of flowing water, mineral oil, or glass.

A high-energy laser beam pulse is fired through the curtain of flowing water and focused upon the opaque overlay on the solid body. The energy of the laser beam is absorbed by the black paint to create peak power densities having an order of magnitude of a gigawatt/cm$^2$, causing a rapid ablation or vaporization of the paint layer into a plasma which produces a rapidly increasing, high-amplitude pressure on the surface of the material.

The normally expanding plasma is confined at the workpiece surface by the curtain of flowing water causing the rapidly rising plasma pressure to generate traveling shockwaves (i.e., pressure waves) that propagate through the surface into the interior of the workpiece. The transparent overlay effectively acts to confine or otherwise contain the shockwaves proximate the workpiece surface and to redirect the shockwaves into the body of the workpiece. The shockwaves cold-work the surface of the workpiece and create compressive residual stresses extending from the surface into the interior of the workpiece. The amplitude length and quantity of the shockwaves determine in part the depth and intensity of the resulting residual compressive stresses formed in the material.

The paint-based opaque layer serves both to protect the target surface from direct incidence of the laser beam and from the high temperature plasma. Ablated paint material is either washed away by the curtain of flowing water, or removed later.

The laser beam(s) may be fired repetitively and in iterative sequence to produce different sets of laser spot patterns on the workpiece. In one form, the workpiece may be treated by developing a matrix of overlapping laser beam spots that cover a critical zone of interest. Additionally, the same or adjacent areas may be repeatedly processed by cyclically directing an energy pulse to the desired target area.

Multiple laser beams may be used to produce any suitable laser beam spot pattern on the workpiece. For example, single-sided and double-sided laser peening operations are possible to form laser peened surfaces on one side and opposite sides, respectively, of a workpiece. For this purpose, multiple laser beams may be generated from multiple laser sources or with other suitable beam technology (e.g., a beam splitter). One type of laser adaptable for use with the invention is the Nd:Glass Laser manufactured by LSP Technologies, Inc. of Dublin, Ohio.

Further descriptions of laser shock peening technology may be found in U.S. Pat. Nos. 5,131,957, 5,741,559, and 5,911,890, collectively assigned to the same assignee as the present invention and incorporated herein by reference thereto.

Various parameters may be controlled by the production manager to tailor the laser shock processing operation. For example, among the operational parameters that the designer can select and adjust, these include (but are not limited to) the location of the incident beam spot, the number of spots, spacing between spots, distance of spots to certain workpiece features (e.g., leading and trailing edge of integrally bladed rotor), angle of incidence, laser firing duration and repetition, and beam intensity.

One advantage of laser shock processing is found in its ability to increase the fatigue properties of the part by selectively developing pre-stressed regions within certain critical areas where incipient flaws or cracks typically appear. The technique has been applied with favorable success to the processing of the pressure and suction sides of leading and trailing edges of fan and compressor airfoils and blades in turbine engines.

The various effects of laser peening on the fatigue properties of welded samples has been reported in "Shockwaves and High Strained Rate Phenomena in Metals" by A. H. Clauer, J. H. Holbrook and B. P. Fairand, Ed. by M. S. Meyers and L. E. Murr, Plenum Press, New York (1981), pp. 675–702 (incorporated herein by reference thereto).

Figure 14:
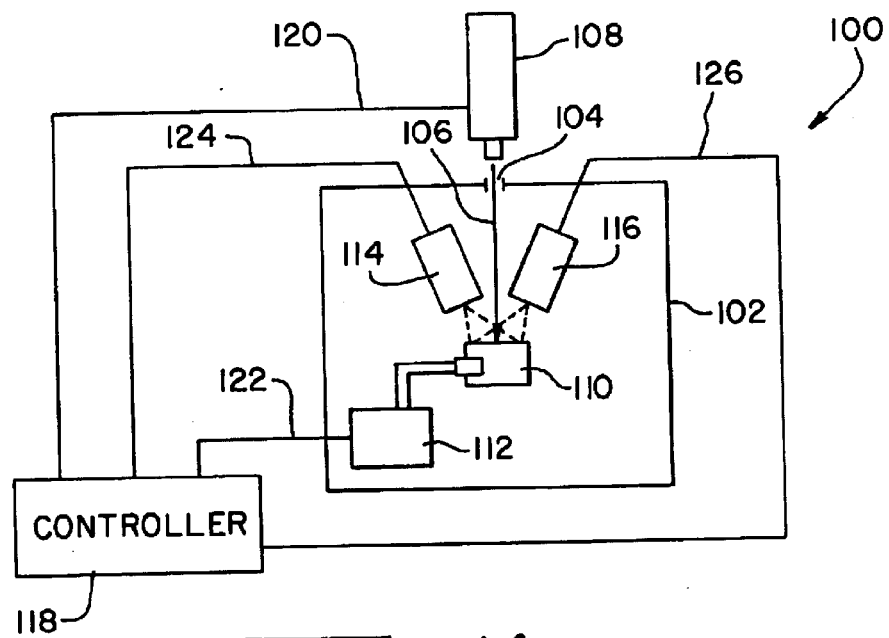
FIG. 14 is a schematic diagram of a laser shock peening apparatus for use in practicing the present invention.

Referring briefly to FIG. 14, there is shown an illustrative laser shock processing (LSP) environment 100 that is representative of the type of configuration capable of being used in connection with the present invention.

The illustrated LSP environment 100 includes a target chamber 102 in which the laser shock process takes place. The target chamber 102 includes an opening 104 to receive a laser beam 106 generated by laser 108, a source of coherent energy. Laser 108, by way of example, may be a commercially available high power pulse laser system capable of delivering more than approximately 40 joules in 5 to 100 nanoseconds. The laser pulse length and focus of the laser beam may be selectively adjusted.

A representative workpiece 110 is held in position within target chamber 102 by means of a suitable positioning mechanism 112. Positioning mechanism 112 may be of the type that includes a robotically controlled arm or other apparatus to precisely position workpiece 110 relative to the operational elements of laser shock peening system 100.

In one illustrative configuration, LSP environment 100 includes a material applicator 114 for applying an opaque overlay, such as a water-based black paint, onto workpiece 110 to create a coated portion. Material applicator 114 may be provided in any suitable form such as a solenoid-operated painting station or other construction, e.g., a jet spray or aerosol unit to provide a small coated area onto workpiece 110.

The material utilized by material applicator 114 is preferably an energy absorbing material, typically a black, water-based paint such as 1000 F AQUATEMP (TM) from Zynolite Product Company of Carson, Calif. Another opaque coating that may be utilized includes ANTI-BOND, a water soluble gum solution including graphite and glycerol from Metco Company, a Division of Perkin-Elmer of Westbury, N.Y. Alternatively, other types of suitable opaque coatings may be used, such as a latex paint made by Sherwin Williams.

LSP environment 100 further includes a transparent overlay applicator 116 that applies a fluid or liquid transparent overlay to workpiece 110 over the portion coated by material applicator 114. The transparent overlay material should be substantially transparent to the incident radiation, with water being the preferred overlay material.

As shown, material applicator 114 and transparent overlay applicator 116 are shown directly located within target chamber 102. However, this is merely illustrative, since in a production environment, only the necessary operative portions need be accessible to the processing environment of target chamber 102, such as the portion through which the materials actually flow, e.g., a fluid dispenser head. The supply tanks for the transparent overlay materials and other energy absorbing materials may be located outside of target chamber 102 or any other suitable location.

A control unit such as controller 118 is operatively associated with the combination of functional elements including material applicator 114, transparent overlay material applicator 116, laser 108, and positioning mechanism 112. In particular, controller 118 is connected to laser 108, positioning mechanism 112, material applicator 114, and transparent overlay material applicator 116 via control lines 120, 122, 124, and 126, respectively. Controller 118 controls the operation and timing of each of the applicators 114 and 116, laser 108, and selective operation of positioning mechanism 112 to ensure proper sequence and timing of system 100. In one configuration, controller 118 may be a programmed personal computer or microprocessor.

In a typical operation, workpiece 110 is located within targeting chamber 102 by positioning mechanism 112. Controller 118, in one illustrative operating sequence, activates material applicator 114 to apply a laser energy absorbing coating such as a water-based black paint onto a particular location of workpiece 110 intended for laser shock processing. Controller 118 next directs transparent overlay material applicator 116 to apply a transparent overlay to the previously coated portion of workpiece 110.

At this point, laser 108 is directed by controller 118 to fire a laser beam 106 that impacts the coated portion. The time between applying the transparent water overlay and the step of directing the laser energy pulse may be on the order of $1.0 \times 10^{-3}$ to 3.0 seconds, for example. By directing this pulse of coherent energy to the coated portion, a shockwave is created at the workpiece surface. As the plasma expands from the impact area, it creates a compressional shockwave passing against and through workpiece 110 that imparts regions of compressive residual stresses within workpiece 110.

The above-described process or portions of the process may be iteratively repeated to shock process the desired surface area of workpiece 110. Depending upon the energy levels and the amount of laser shock peening desired on workpiece 110, controller 118 may instruct positioning mechanism 112 to re-position or re-index workpiece 110 to a new location or orientation. This mobility of workpiece 110 and/or laser 108 (by means not shown) enables further laser shock peening operations to be performed that may process the same or different portions of the workpiece, for example, the formation of a matrix of laser beam spots overlapping the previously peened area. Each additional operating sequence typically requires its own set of coatings to be applied to the workpiece and an accompanying sequence of laser firings from laser 108. Any suitable means may be provided to change the relative spatial relationship (e.g., orientation and distance) between the laser and workpiece.

The present invention may be practiced in connection with any suitable workpiece or object. A workpiece may include any solid body, article, or other suitable structure that is amenable to or otherwise capable of being treated by laser shock processing. The workpiece may represent a constituent piece forming part of an in-production assembly, a final production article, or any other desired part. Accordingly, the laser shock processing treatment may be applied at any stage of production, i.e., a pre- or post-manufacturing step or other intervening time.

In certain industrial applications, the present invention finds significant use in processing the airfoils of turbine engines, most notably in the region proximate the leading and trailing edges where flaws and other high-cycle failures pose serious problems affecting the performance and durability of the engine.

Figure 15:
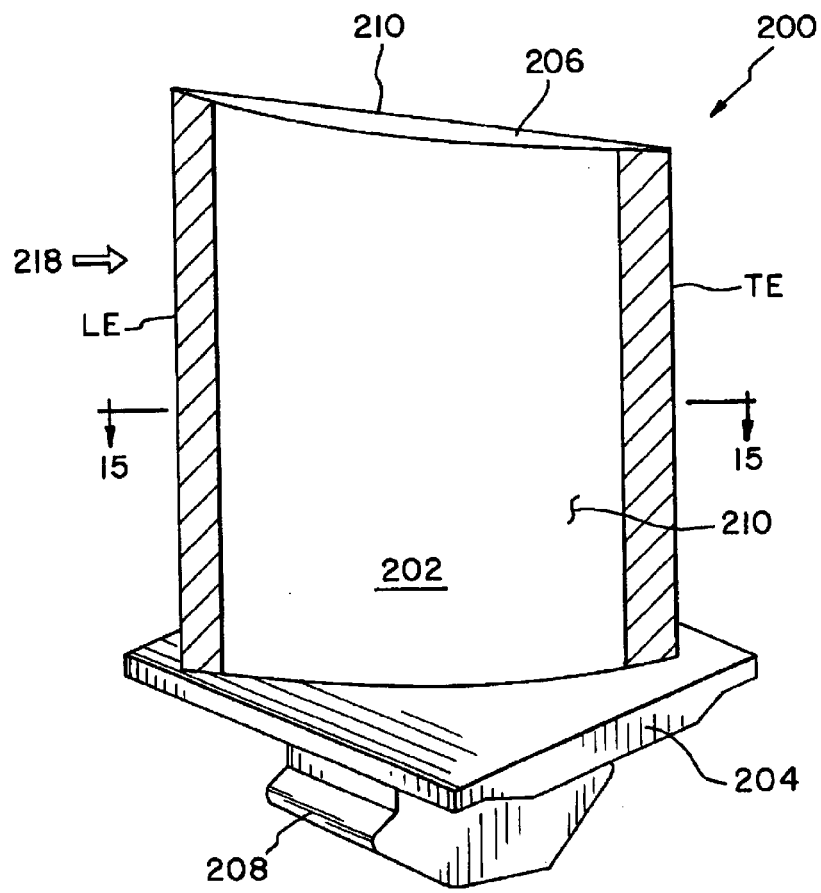
FIG. 15 is a schematic perspective view of an engine blade capable of being processed and produced by the present invention.
Figure 16:
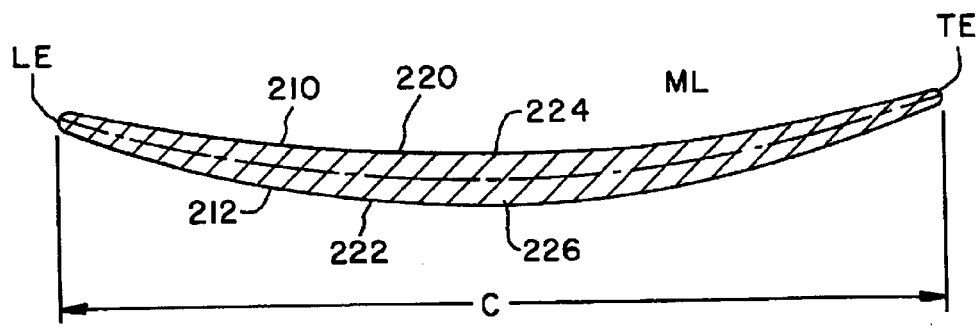
FIG. 16 is a cross-sectional schematic view of the airfoil portion of the engine blade shown in FIG. 15, taken along lines 15—15.

Referring briefly to FIG. 15, there is shown a perspective view of an illustrative aircraft gas turbine engine airfoil 200 with which the present invention can be practiced. FIG. 16 is a planar cross-sectional schematic view of the airfoil section of engine blade 200, taken along lines 15—15 in FIG. 15.

The illustrated aircraft engine blade 200 includes an airfoil 202 extending radially outward from a blade platform 204 to a blade tip 206. The engine blade 200 includes a root section 208 for attachment to a rotor. Alternately, some blades are machined from a forged or cast integrally with a rotor, to produce blisk or integrated rotor and disk assembly. Airfoil 202 includes a leading edge LE and a trailing edge TE.

Referring further to FIG. 16, a chord C of airfoil 202 is the line between the leading edge LE and the trailing edge TE at each cross-section of the engine airfoil. Airfoil 202 extends in a chordwise direction between the leading edge LE and trailing edge TE. A pressure side 210 of airfoil 202 faces in the general direction of rotation, while a suction side 212 is on the other side of airfoil 202. A mean-line ML is generally disposed midway between the two faces (i.e., pressure and suction sides) in the chordwise direction.

The airfoil tip 206 extends along the tip of airfoil 202 from the leading edge LE to the trailing edge TE. The airfoil section depicted by FIG. 16 is of solid body construction.

Arrows 218 generally depict the orientation of a potential laser peening operation against airfoil 200. Of course, other orientations and positions of laser peening may be applied to blade 200. For example, referring to FIG. 16, pressure side 210 and suction side 212 may be laser shock peened to produce respective laser shock peened surfaces 220 and 222 having respective regions 224 and 226 with deep compressive residual stresses imparted by laser shock peening extending into airfoil 202 from the laser shock peened surfaces.

Figure 1:
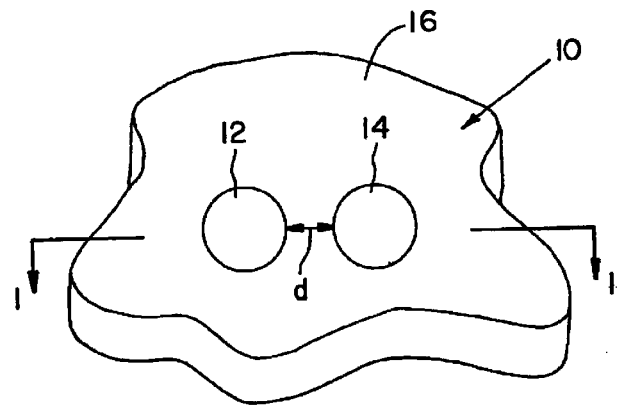
FIG. 1 is an upper perspective sectional schematic view of a workpiece portion illustrating a configuration of laser shock peened surface areas, according to a first embodiment of the present invention.
Figure 2A:
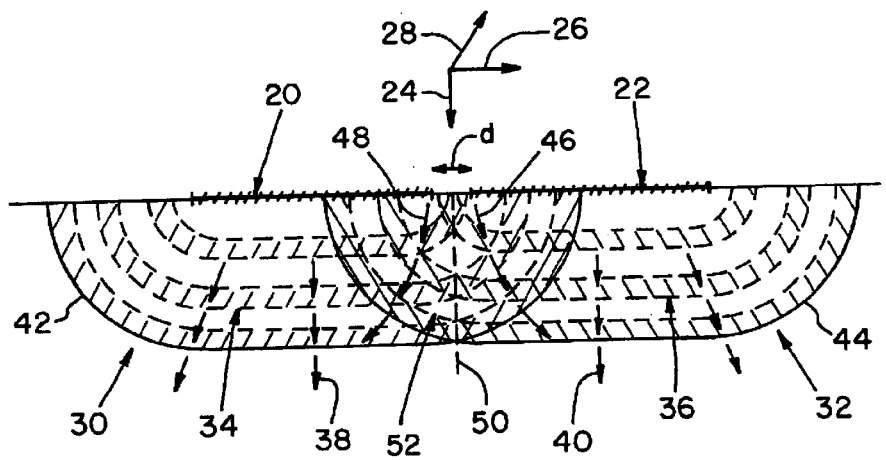
FIG. 2A is a partial cross-sectional schematic view of the workpiece portion shown in FIG. 1 illustrating the interaction between shockwaves induced by laser shock peening.
Figure 2B:
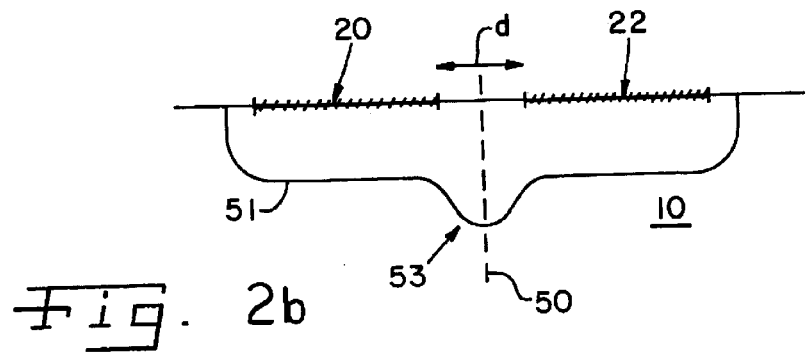
FIG. 2B is a partial cross-sectional schematic view of the workpiece shown in FIG. 1, illustrating a representative stress contour line.

Turning now to the present invention, reference is first made to FIG. 1, which illustrates a representative laser beam spot configuration forming a set of laser shock peened surface areas on workpiece 10, according to a first embodiment of the present invention. FIG. 2A is a cross-sectional planar view of workpiece 10 taken along lines 1—1 of FIG. 1. FIG. 2B is a similar cross-sectional planar view of workpiece 10, showing an illustrative stress contour line that is representative of the stress distribution profile which follows from the type of laser shock processing depicted in FIG. 1.

Workpiece 10 is irradiated with a set of laser beam spots 12 and 14 applied simultaneously to the surface 16 of workpiece 10 to form a respective set of adjacent non-overlapping laser shock peened surface areas coextensive with the dimensions of the laser beam spots. This treatment of workpiece 10 is conducted in accordance with a suitably configured laser shock processing operation. As shown, the laser beam spots 12, 14 are configured to have a selective spatial separation distance "d".

The spaced-apart relationship between laser beam spots 12, 14 (and hence the respective laser shock peened surfaces) is a parameter that is chosen with a view towards enabling the traveling shockwaves induced by laser shock peening to encounter one another within the interior of workpiece 10, as explained more fully in connection with FIG. 2A. It should be understood that the adjacent non-overlapping relationship between the laser shock peened surfaces formed in accordance with the first embodiment encompasses any suitable proximate relationship sufficient to achieve the advantages of the first embodiment, namely, to enable the generated shockwaves to meet and interact with one another. In one preferred form, the laser beam spots 12, 14 will be in close proximity to one another, with a spatial separation of 5 mm or less.

Additionally, while it is preferred that laser beam spots 12, 14 be simultaneously applied to workpiece 10, this temporal condition should be understood as encompassing a nominally simultaneous, substantially simultaneous, or other adequate form of concurrent laser beam application that provides a near-simultaneous result sufficient to achieve the desired purposes. This understanding of simultaneity also applies to other uses of this term herein. Use of the same laser oscillator on the beams or shockwaves starting or having a peak within $5 \times 10^{-9}$ sec or less is simultaneous for the needs of the present application.

Moreover, although FIG. 1 shows one set of adjacent non-overlapping laser beam spots 12, 14, this configuration is provided for illustrative purposes only and should not be seen in limitation of the present invention, as any number of such beam spots can be similarly formed. For example, a set of three adjacent non-overlapping laser beam spots configured in a triangular arrangement can be simultaneously formed, according to the first embodiment. Additionally, although the individual laser beam spots preferably have a circular shape, this is provided for illustrative purposes only, as any suitable laser beam spot shape can be employed.

Referring now to FIG. 2A, laser beam spots 12, 14 from FIG. 1 are depicted as forming respective laser shock peened surface areas 20 and 22 on workpiece 10. As known, the laser shock peening activity that forms laser shock peened surfaces 20, 22 induces a shockwave that radiates or emanates into the body of workpiece 10 from its respective laser shock peened surface.

The shockwaves induced by laser shock peening generally define a traveling pressure-type energy vector that traverses a medium in a three-dimensional manner and occupies a volumetric space. For example, in workpiece 10, it may be considered that the shockwaves have constituent components with mutually orthogonal directions of propagation that include a direction 24 normal to the surface projecting underneath the laser shock peened surface, a radial or lateral direction 26 projecting away from the laser shock peened surface (i.e., towards the adjacent laser shock peened surface), and a transverse direction 28, such directions may be applied even if surface is curved by using tangent links to the surface.

The shockwaves may initially take the form of planar wavefronts that become more spherical during propagation. For example, shockwaves generally illustrated at 30 and 32 emanating from respective laser shock peened surfaces 20 and 22 are shown propagating in the illustrated manner. For purposes of description, each shockwave 30, 32 is respectively depicted in the form of a series of representative wavefronts 34, 36 with leading edges 42, 44 having the indicated propagation directions specified by arrows 38, 40.

The shaded area behind the wavefront represents the distance behind the wavefront at which the magnitude of the shock pressure decreases to one half the Hugoniot Elastic Limit (HEL) for the workpiece material. The HEL is the threshold shockwave pressure above which the material yields dynamically and develops plastic strain or cold work. When these portions of the intersecting shockwaves overlap the combined pressures jump about the HEL. The material yields, and increases further plastic strain. Since the amount of plastic strain produced in this region of the material is higher than the at produced by as isolated or single laser beam spot, the higher plastic strains will generate higher compressive residual stresses compared to a single shot.

Regarding shockwave 30, particular interest is drawn to the propagation direction 46 which illustrates the manner in which shockwave 30 moves laterally from the surface towards the vicinity of the adjacent or neighboring laser shock peened surface 22 and its associated shockwave 32. Likewise, attention is drawn to the propagation direction 48 which illustrates the manner in which shockwave 32 moves laterally from the surface towards the vicinity of the neighboring laser shock peened surface 20 and its associated shockwave 30.

The proximal relationship between laser shock peened surfaces 22 and 20 is such that the simultaneously generated traveling shockwaves 30 and 32 will meet or otherwise encounter one another at a generally planar location disposed nominally midway between the laser shock peened surfaces 22, 20, as specified by plane 50. This shockwave intersection zone is generally shown at 52 and is generally circumscribed by the illustrated overlap between the shaded areas of the respective shockwaves 30, 32.

In various forms, the interaction of the shockwaves may be understood as involving an encounter, reinforcement, collision, meeting, intersection, interface, or engagement between the shockwaves. In a preferred form, it is understood that the encountering shockwaves favorably experience a synergistic interaction that generally exhibits a constructive interference-type effect or wave superposition that essentially yields an additive combination of the pressures provided by each of the shockwaves.

Since the shockwaves experience such additive synergism (at least in part), it therefore becomes possible for the shockwave interaction zone 52 to feature an enhanced compressive residual stress region having compressive residual stresses that are higher than that available from a single isolated shockwave. Combining the pressures of the shockwaves significantly increases the peak pressure experienced by the material in the vicinity of the intersection plane 50.

In particular, the higher peak pressures generally along and about the intersection plane 50 result in higher plastic strains along and about plane 50. Because of the additive nature of this shockwave interaction, peak pressures above the dynamic yield strength of the workpiece (e.g., metal) are also sustained to a much deeper depth in the vicinity of the intersection plane 50 than would otherwise be the case if a single shockwave was proceeding through the material. This feature enables higher plastic strains to be driven deeper into the workpiece, and causes the magnitude of the compressive residual stresses to be higher, located further below the laser shock peened surface.

Moreover, the radial emanation of the shockwaves from their point of origin at the laser shock peened surface enables the formation of a shockwave interaction zone 52 that lies at least in part at a subsurface location disposed between the volumetric areas lying immediately beneath the laser shock peened surfaces 20, 22. This provides designers with the opportunity to create strengthened compressive residual stress regions in locations that are beyond the subsurface areas which extend directly immediately below the laser shock peened surface.

Referring now to FIGS. 3–6, there are shown various laser beam spot patterns configured to create various arrangements of shockwave interaction locations that drive compressive residual stresses deeper locally, according to various alternative forms of the first embodiment of FIG. 1.

Following upon the discussion above, reference is made to FIG. 2B to show in representative fashion the manner in which the stress distribution profile is modified in connection with the laser shock peening process of FIG. 1. Line 51 is a representative uniform stress contour line corresponding to a particular level of deep compressive residual stress induced by laser shock peening, namely, the formation of laser shock peened surfaces 20 and 22. In one form, line 51 can be considered an isopiestic feature, i.e., a feature marked by equal pressure or an isobar. It is of course the case that a complete stress distribution profile will include a plurality of individual spaced-apart stress contour lines each corresponding to a specific stress level.

FIG. 2B diagrammatically correlates the pressure level represented by stress contour line 51 to both thickness and lateral or radial dimensions. For example, stress contour line 51 extends fully across the lateral dimension that encompasses the area under both laser shock peened surfaces 20, 22 and the separation distance "d" therebetween. Notable, in the vicinity of the shockwave intersection plane 50 that traverses this separation distance, stress contour line 51 exhibits a peak portion generally illustrated at 53. In one form, the peak portion 53 can be considered to have a generally bell-shaped curvature.

A correlation of peak portion 53 to the thickness dimension of the workpiece indicates that the compressive residual stress represented by stress contour 51 extends deeper into workpiece 10 relative to the penetration depth that exists in the regions underlying the laser shock peened surfaces 20, 22. As noted above, this deeper penetration depth occurs because the induced shockwaves that emanate from surfaces 20, 22 will synergistically interact with one another within the vicinity of plane 50 in a manner that causes the related pressure fields (i.e., imparted stress) to combine constructively, yielding the peak portion 53 of stress contour 51. Other stress contour lines will exhibit a similar peak pressure feature.

Figure 3:
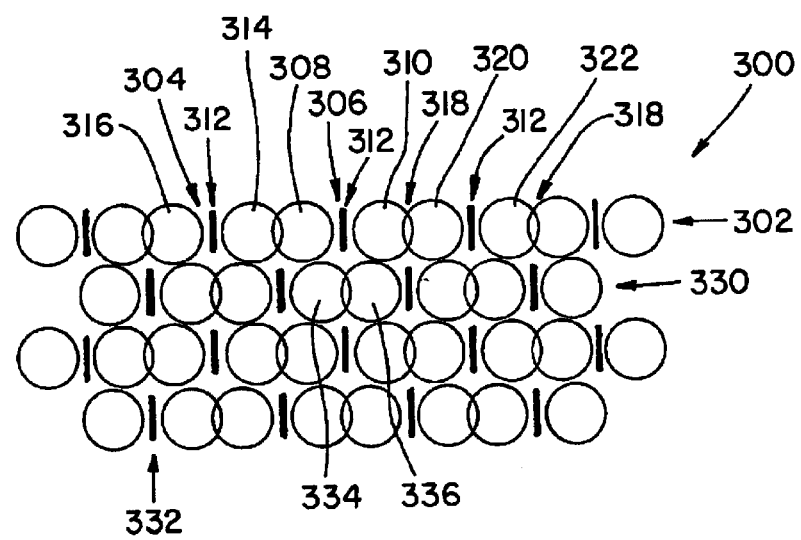
FIG. 3 is an upper planar view of an illustrative laser beam spot pattern, according to a first form of the first embodiment of FIG. 1.

Referring first to FIG. 3, the illustrated laser beam spot pattern 300 includes at least one row of circular laser beam spots 302 arranged in individual pairs 306 of first and second laser shock peened surfaces 308, 310 spaced-apart from one another by a sufficient distance (such as distance "d" in FIG. 1) to enable the formation of a shockwave interaction location (such as zone 52 in FIG. 2A) generally illustrated at 312. Adjacent laser beam spot pairs 304, 306 within the same row are overlapped.

Shockwave interaction site 312 is formed between laser beam spot 308 and laser beam spot 310 of laser beam spot pair 306 in a manner similar to the formation of shockwave interaction zone 52 formed between laser shock peened surfaces 20 and 22 in FIG. 2A. The spot pattern 300 may be simultaneously formed all at once or in a sequence of laser shock peening stages, such as pair-wise formation of the laser shock peened surfaces associated with each shockwave interaction site.

Within each row 302, it is seen that each shockwave interaction site 312 alternates with a spot overlap site generally illustrated at 318 defined by the overlap between associated laser beam spot pair 304 (consisting of laser beam spots 316 and 314) and laser beam spot pair 306 (consisting of laser beam spots 308 and 310). Within each row, then, there is provided a sequence of uniformly spaced deep residual stress points (namely, the compressive residual stress regions produced in conjunction with each shockwave interaction site 312) alternating with laser beam spot overlap points 318. The beam spot overlap region 318 has a mild effect in intensifying the laser peening under the overlapped area.

Although FIG. 3 shows shockwave interaction sites 312 being formed in a periodic or regular manner across a row 302, it should be understood that a different laser beam spot pattern may be used which forms a row sequence of shockwave interaction sites 312 having a selectively aperiodic, irregular, or random spacing. The irregular spacing may be selected to define a configuration of shockwave interaction sites, for example, that match against a known, expected, or unknown defect pattern in the workpiece, thereby serving as a counter-distortion or workpiece life span enhancement measure.

The relationship among the rows may take various alternate forms. For example, neighboring rows 302 and 330 may be staggered or offset from one another as shown in FIG. 3. In this form, the shockwave interaction sites 312 and beam spot overlap sites 318 sequentially alternate from one row to the next to define a column-type alignment, as exemplified along illustrative column line 332. Alternately, neighboring rows can be identically aligned such that similarly situated shockwave interaction sites from different rows will line up with one another in a column-type linear format. Likewise, similarly positioned beam spot overlap sites from different rows will line up with one another in a column-type format.

Additionally, the laser beam spots of neighboring rows may or may not overlap with one another. In a configuration that permits neighboring row overlaps, it is illustratively seen for example that associated laser beam spots 308, 310 of pair 306 in row 302 may overlap respectively with laser beam spots 334 and 336 belonging to different (but adjacent) laser beam spot pairs in neighboring row 330.

For all rows of circular laser beam spots discussed herein, it is preferable that the laser beam spots within a row have their center points in linear alignment.

Figure 4:
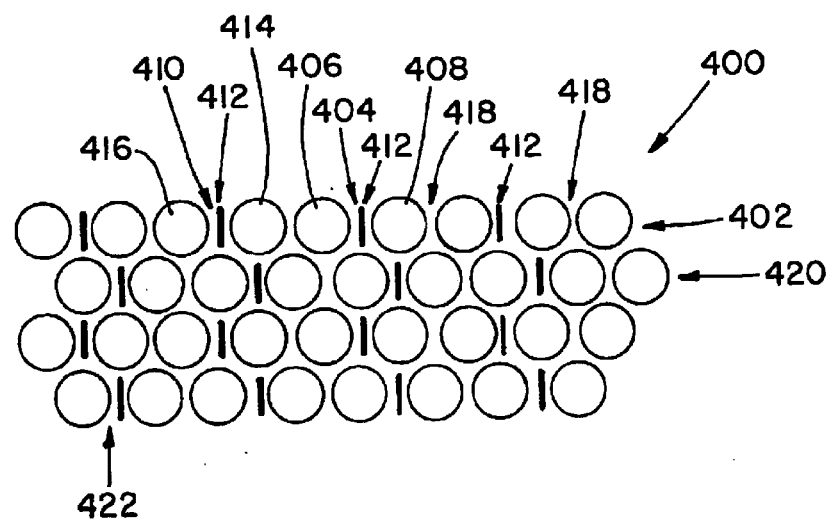
FIG. 4 is an upper planar view of an illustrative laser beam spot pattern, according to a second form of the first embodiment of FIG. 1.

Referring next to FIG. 4, the illustrated laser beam spot pattern 400 includes at least one row of circular laser beam spots 402 arranged in non-overlapping individual pairs 404 (consisting of laser beam spots 406 and 408). Adjacent laser beam spot pairs 406, 408 within the same pair 404 and 402 row are spaced-apart from one another by a sufficient distance (such as distance "d" in FIG. 1) to enable the formation of a shockwave interaction location (such as zone 52 in FIG. 2A) generally illustrated at 412.

Shockwave interaction site 412 is formed between laser beam spot 406 and laser beam spot 408 in a manner similar to the formation f shockwave interaction zone 52 formed between laser shock peened surfaces 20 and 22 in FIG. 2A. The spot pattern 400 may be simultaneously formed all at once or in a sequence of laser shock peening stages, such as pair-wise formation of the laser shock peened surfaces associated with each shockwave interaction site.

Within each row 402, it is seen that each shockwave interaction site 412 alternates with a bridging site generally illustrated at 418 defined by the non-overlap area between associated laser beam spot pairs. Within each row, then, there is provided a sequence of spaced deep residual stress points (namely, the compressive residual stress regions produced in conjunction with each shockwave interaction site 412) that alternate with bridging regions 418.

Although FIG. 4 shows shockwave interaction sites 412 being formed in a periodic or regular manner across a row 402, it should be understood that a different laser beam spot pattern may be used which forms a row sequence of shockwave interaction sites 412 having a selectively aperiodic, irregular, or random spacing. The irregular spacing may be selected to define a configuration of shockwave interaction sites, for example, that match against a known or expected defect pattern in the workpiece.

The relationship among the rows may take various alternate forms. For example, neighboring rows 402 and 420 may be staggered or offset from one another as shown in FIG. 4. In this form, the shockwave interaction sites 412 positionally alternate in a zig-zag fashion from one row to the next along a general column-type orientation such as direction 422. Alternately, neighboring rows can be identically aligned such that similarly situated shockwave interaction sites from different rows will line up with one another in a column-type linear format. Likewise, similarly positioned bridging regions from different rows will line up with one another in a column-type format.

Figure 5:
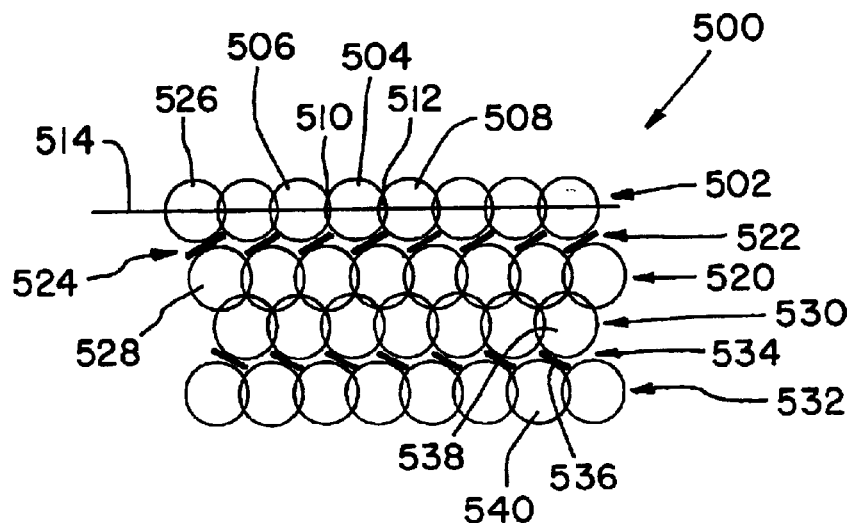
FIG. 5 is an upper planar view of an illustrative laser beam spot pattern, according to a third form of the first embodiment of FIG. 1.

Referring next to FIG. 5, the illustrated laser beam spot pattern 500 includes at least one row of overlapping circular laser beam spots 502 in which individual laser beam spots 504 overlap with neighboring laser beam spots 506, 508 to form spot overlap regions generally illustrated at 510 and 512, respectively. Within laser beam spot row 502, for example, the individual spot overlap regions have a generally linear row alignment, as exemplified by illustrative line 514.

Select ones of the adjacent rows such as rows 502 and 520 may be configured relative to one another such that a row-aligned sequence of shockwave intersection sites (generally illustrated at 522) may be formed between a respective set of laser beam spots assigned to adjacent rows. For example, sequence 522 includes an illustrative shockwave intersection site 524 formed between proximately spaced laser beam spots 526 and 528 belonging to beam spot rows 502 and 520, respectively.

For this purpose, the individual rows 502, 520 would be formed such that illustrative laser beam spots 526, 528 would be spaced-apart by a sufficient distance (such as distance "d" in FIG. 1) to enable formation of the shockwave interaction site 524 therebetween, similar to zone 52 in FIG. 2A.

In particular, shockwave interaction site 524 is formed between laser beam spots 526 and 528 in a manner similar to the formation of shockwave interaction zone 52 formed between laser shock peened surfaces 20 and 22 in FIG. 2A. The spot pattern 500 may be simultaneously formed all at once or in a sequence of laser shock peening stages, such as pair-wise formation of the laser shock peened surfaces associated with each shockwave interaction site.

One significant feature of laser beam spot pattern 500 is that each sequence 522 of row-aligned shockwave interaction sites 524 has a common orientation or directionality. Thus, if the rows of shockwave interaction sites are located and oriented properly to known crack propagation directions (e.g., oriented generally perpendicular to the crack propagation direction), the shockwave interaction regions will present a significant enhancement to the crack retarding capability of the laser peened areas and compressive residual stress regions.

Moreover, regarding adjacent laser beam spot rows 530 and 532, it is seen that these rows may be configured to define another sequence 534 of row-aligned shockwave interaction sites 536 disposed therebetween. Notably, the shockwave interaction sites 536 of sequence 534 have a common orientation or directionality different than that relating to sequence 522. This orientation is possible, for example, by suitably configuring the laser beam spot rows 530, 532 to enable the formation of illustrative shockwave interaction site 536 between proximal laser beam spots 538 and 540 of rows 530 and 532, respectively. A staggering or offset between the rows may produce the desired orientational characteristic, such as shown in FIG. 5.

It is possible to establish any matrix of sequential shockwave interaction sites having selective orientations by suitable configuration of the laser beam spot rows. Thus, as one proceeds in row-like fashion through pattern 500, it is possible to create any arrangement of orientations among the rows. For example, the orientation may remain the same or alternate among the rows.

Additionally, rows of sequential shockwave interaction sites (such as 522 and 534) may be interleaved with row(s) of spot overlap regions, such as the spot overlap row defined between adjacent laser beams spot rows 520 and 530.

Figure 6:
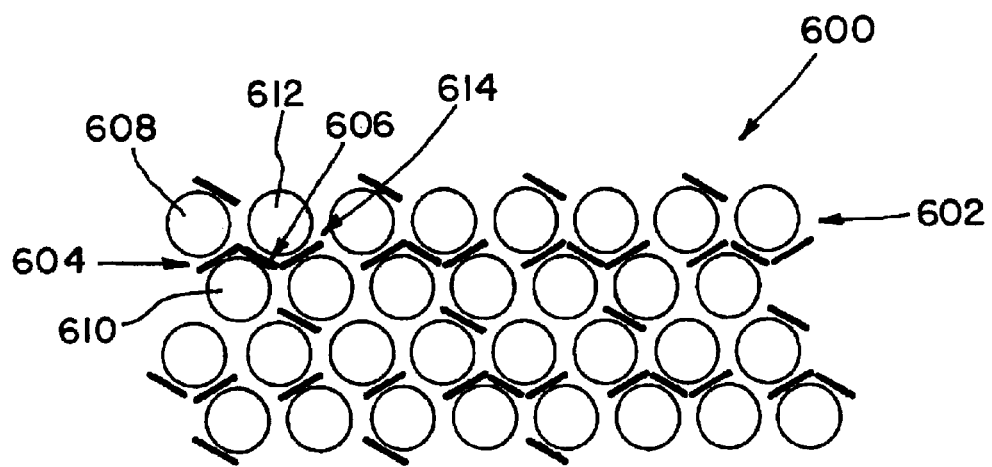
FIG. 6 is an upper planar view of an illustrative laser beam spot pattern, according to a fourth form of the first embodiment of FIG. 1.

Referring next to FIG. 6, the illustrated laser beam spot pattern 600 includes plural rows 602 of circular laser beam spots produced by a succession of individual laser beam spot patterns applied to the workpiece to generate a selective arrangement of shockwave interaction sites 604. Pattern 600 is the composite result of iteratively applying multiple layers of laser shock peening to the workpiece surface, including areas that are repeatedly laser shock peened. Each processing iteration, for example, would produce a configuration of shockwave interaction sites having a desired orientation. Multiple iterations would therefore introduce several such orientations into the workpiece.

For example, during a first laser shock processing iteration, a suitable laser beam pattern may be applied that induces the formation of illustrative shockwave interaction sites 604 having the indicated first orientation direction. A second laser shock processing iteration would then commence following the first iteration to induce the formation illustrative shockwave interaction sites 606 having the indicated second orientation direction different from the first orientation.

Generally the same workpiece surface area would be laser shock peened to facilitate the creation of both configurations of shockwave interaction sites 604 and 606. For example, in the first processing iteration, a suitable set of laser shock peened surface areas associated with laser beam spots 608 and 610 would be formed in the manner set forth in connection with FIGS. 1 and 2 to form shockwave interaction site 604. Similarly, in the second processing iteration, a suitable set of laser shock peened surface areas associated with laser beam spots 610 and 612 would be formed to create shockwave interaction site 606. The surface area associated with laser beam spot 612 would have been irradiated during the first iteration to form the indicated shockwave interaction site 614 having the same orientation as site 604.

FIG. 6 shows the effect of addressing multiple orientations of the shockwave interaction regions when applying multiple layers of laser peening to the same area. In this manner, the orientation of the interactions region can be changed from layer to layer to address multiple row orientations for the interaction regions. Using this iterative layering approach to form successive laser beam spot patterns each having a corresponding orientation for the shockwave interaction regions, it is possible to surround each circular-type laser peened surface area with six shockwave interaction regions by employing an equal number (6) of laser beam spot pattern layers.

This use of successive laser beam spot pattern layers permits an adaptive strategy to be developed that tailors the configuration of shockwave interaction sites to specified features in the workpiece.

Figure 7:
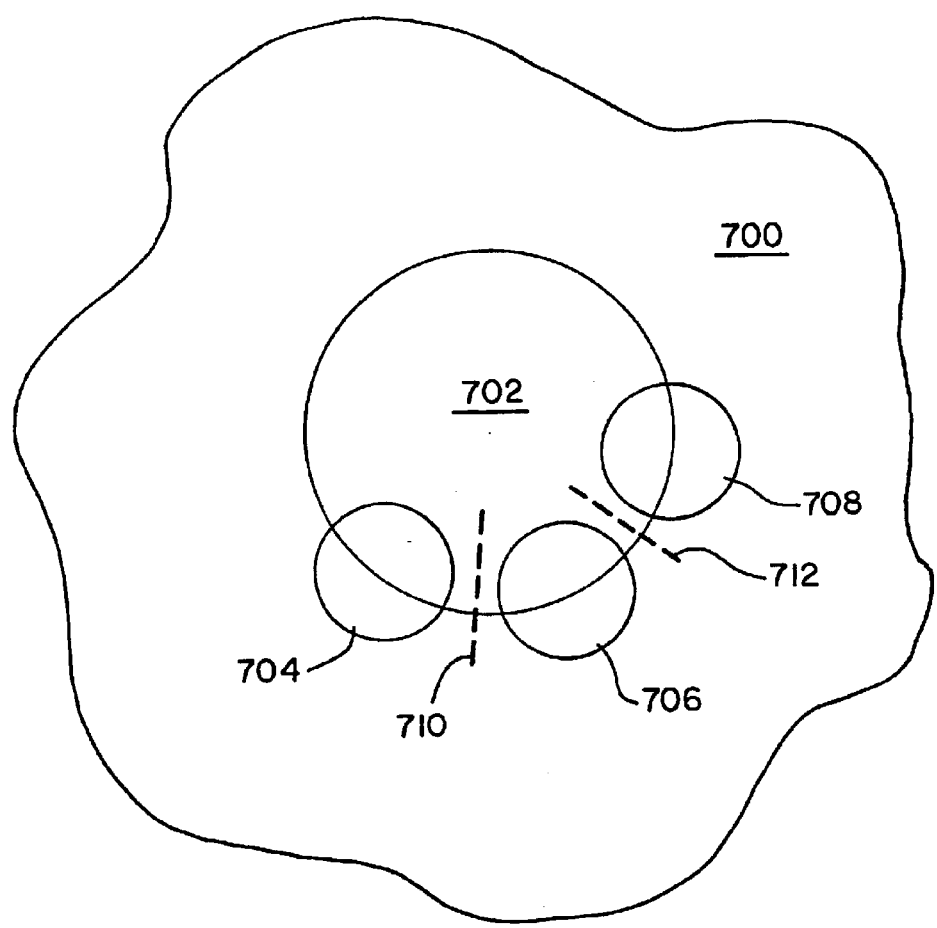
FIG. 7 is an upper planar sectional view of a workpiece portion showing an illustrative configuration of laser beam spots useful in developing compressive residual stresses around a hole, applying the principles of the first embodiment of the invention depicted in FIG. 1.

For example, referring to FIG. 7, there is shown a workpiece surface 700 having a hole 702 where incipient flaws and cracks can easily develop. The processing techniques illustrated by FIGS. 1–6 are used to laser shock peen the circumferential portion about hole 702 to increase the circumferential compressive residual stresses around the hole.

As shown, a set of laser beam spots 704, 706 and 708 are applied circumferentially about the peripheral edge of hole 702 to form corresponding laser shock peened surface areas. For example, in a first processing iteration, a suitable set of laser beams may be used to form neighboring laser beam spots 704 and 706 to develop a corresponding shockwave interaction region located along and proximate to illustrative intersection plane 710 disposed nominally midway between spots 704 and 706.

Similarly, in a second processing iteration, a suitable set of laser beams may be used to form neighboring laser beam spots 706 and 708 to develop a corresponding shockwave interaction region located along and proximate to illustrative intersection plane 712 disposed nominally midway between spots 706 and 708.

This pair-wise formation of neighboring laser beam spots is continuously repeated until the entire circumference has been covered. As a result, there is developed about the periphery of hole 702 a plurality of regions having deep compressive residual stresses each formed in the vicinity of a shockwave interaction site, as identified by illustrative shockwave intersection planes 710 and 712.

The laser beam spot patterns shown herein are provided for illustrative purposes only and should not be considered in limitation of the present invention. Rather, it should be apparent that any suitable laser beam spot pattern can be used to facilitate the advantages described herein.

Reference is now made to FIGS. 8 and 9 to illustrate a laser shock processing operation, according to a second embodiment of the present invention. As discussed further, this embodiment involves a dual-sided laser shock peening operation that forms fully opposing laser shock peened surfaces at opposing sides of a workpiece using an operating sequence that forms the relevant laser beam spots at different times.

Figure 8A:
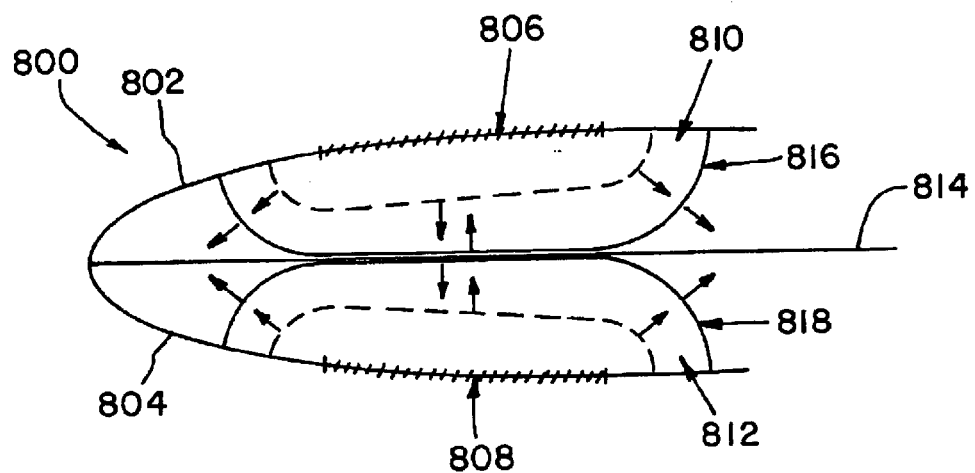
FIG. 8A is a planar cross-sectional view of a workpiece section to illustrate a typical dual-sided laser shock peening operation.

For comparison purposes, reference is first made to FIG. 8A, which depicts the double-sided laser shock peening of a thin section using laser beams arriving at opposite sides of the workpiece at the same time. In particular, workpiece section 800 having opposite sides 802, 804 is simultaneously laser shock peened at sides 802, 804 to form laser shock peened surfaces 806 and 808, respectively.

As shown, shockwaves 810, 812 induced by laser shock peening propagate toward one another from respective laser shock peened surfaces 806, 808. Since the shockwaves 810, 812 were likewise created simultaneously, the shockwaves 810, 812 will meet nominally at the mid-plane 814 through the thickness dimension of workpiece 800, as illustrated by the intimate confronting relationship along mid-plane 814 between the leading wavefront edges 816 and 818 of shockwaves 810 and 812, respectively.

Figure 8B:
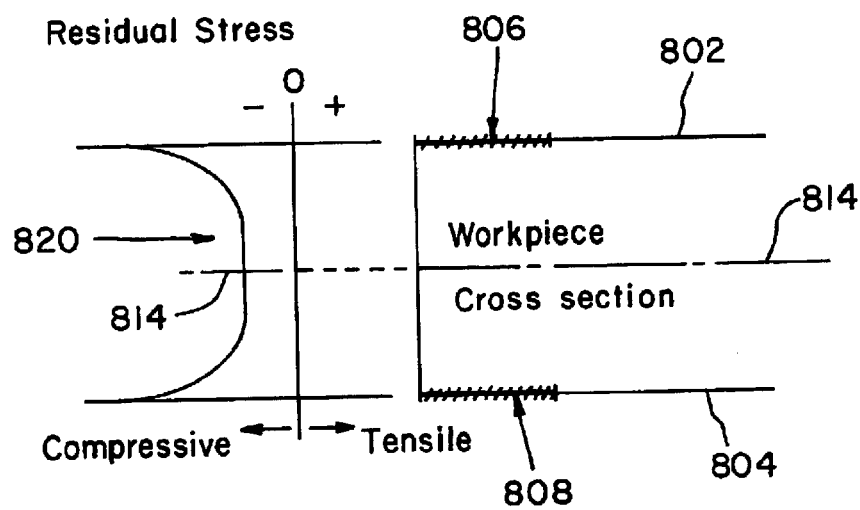
FIG. 8B is a diagrammatic representation residual stress profile pertaining to the processed workpiece of FIG. 8A.

The shockwave interaction depicted in FIG. 8A will produce a high amount of plastic strain at mid-thickness, as represented diagrammatically in the corresponding residual stress profile of FIG. 8B. For the purpose of this discussion it will be assumed that the residual compressive stress and the tensile strain profiles are similar. The graphic depiction of the profile is shown in juxtaposition to a schematic representation of the workpiece cross-section to facilitate an understanding of how the compressive residual stress (and tensile strain) varies with depth from the laser shock peened surface.

As shown in FIG. 8B, the profile curve 820 indicates that the distribution of plastic strain and compressive stress through the thickness is nominally symmetrical about the mid-thickness plane 814. In particular, the compressive residual stress levels resulting from both shockwaves 810, 812 decrease with the same gradient (i.e., curvature) from their respective laser shock peened surfaces to the mid-plane 814.

Figure 9A:
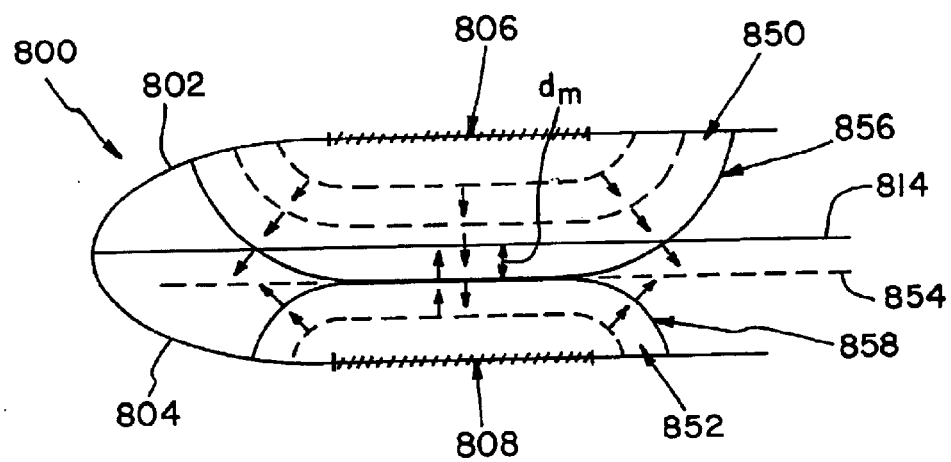
FIG. 9A is a planar cross-sectional view of a workpiece section to illustrate a dual-sided laser shock peening operation, according to a second embodiment of the present invention.

Referring next to FIG. 9A, there is shown a cross-sectional view which depicts the double-sided laser shock peening of a thin section using laser beams arriving at opposite sides of the workpiece at different times, according to the second embodiment of the present invention.

In particular, with regard to the same workpiece section 800 shown in FIG. 8, workpiece 800 is laser shock peened at different times at sides 802, 804 to form laser shock peened surfaces 806 and 808, respectively. The individual laser beams producing laser shock peened surfaces 806, 808 are timed to arrive at their respective surface destinations (namely, opposite sides 802, 804) at a selected time interval apart (i.e., a delay time). In a preferred form, this time interval will nominally be on the order of 1 ns to 100 ns.

It is preferable that the laser shock peened surfaces 806, 808 be shaped and dimensioned identically. This requires, for example, the use of identical laser beam spots. Additionally, it is preferable that the laser shock peened surfaces 806, 808 be formed so as to be fully opposing one another, namely, that there is no lateral offset therebetween.

In the illustration of FIG. 9A, the laser beam incident on lower surface 804 arrives later than the laser beam incident on upper surface 802, inducing a time-staggered set of shockwaves 850 and 852 that propagate toward one another from respective laser shock peened surfaces 806, 808. Consequently, unlike the shockwaves of FIG. 8 which meet nominally at the mid-thickness plane, the time-staggered shockwaves 850 and 852 induced by laser shock peening meet at a point apart from mid-plane 814.

This shift or displacement in the shockwave meeting point occurs because the shockwaves 850, 852 are generated in a time-staggered manner, allowing the first-generated shockwave 850 to pass through mid-plane 814 before it encounters the later-generated shockwave 852. Their meeting point is indicated by the illustrative intersection plane 854 defining the generally planar junction where the respective leading edges 856 and 858 of shockwaves 850 and 852 encounter one another.

The intersection plane 854 is shown spaced-apart and below mid-plane 814 by representative distance $d_M$. This separation distance from the mid-plane 814 will increase with a longer delay time between the incidence of the laser peening beams, and with increasing sound velocity in the material, as discussed below.

The following analysis describes the relationship between the delay time, material properties, and distance from the mid-plane of the thin section at which the time-staggered shockwaves meet.

The following parameters are defined:

$t_o$=transit time of the shockwave, generated by the first laser beam, from the workpiece surface until it meets the shockwave generated by the second laser beam within the material;

$t_d$=delay time between the time of arrival of the first beam pulse and the second beam pulse at the surface;

c=sound velocity in the material being laser peened;

h=section thickness of the workpiece at the laser peening location;

$d_1$=distance into the material traveled by the shockwave from the first beam;

$d_2$=distance into the material traveled by the shockwave from the second beam;

$d_m$=distance from the section mid-plane where the shockwaves from opposite surfaces meet.

The opposing time-staggered shockwaves meet within the workpiece when the following conditions are satisfied:

$$d_1 + d_2 = h, \text{ where} \tag{1}$$

$$d_1 = t_o * c \text{ and} \tag{2}$$

$$d_2 = (t_o - t_d) * c. \tag{3}$$

Manipulating these equations yields:

$$t_o = (h/2c) + (t_d/2). \tag{4}$$

The shockwaves will meet off-center by the distance:

$$d_m = (h/2) - d_2 \tag{5}$$

Substituting equations (3) and (4) into (5) yields:

$d_m = (h/2) - [(h/2c) + (t_d/2) - t_d)]*c$, which provides $d_m = (t_d*c)/2$, for $t_d < h/c$, independent of the thin section thickness.(6)

As an example, in Ti-6Al-4V where c=5.13 mm/μs, for a delay time of 20 ns (0.02 μs), $d_m$ would be 0.05 mm (0.002 inches). If the delay were 100 ns (0.1 μs), $d_m$ would be 0.26 mm (0.010 inches). In thin sections only 1 or 2 mm thick, such as in compressor airfoils of aircraft gas turbine engines, this is a significant effect.

Figure 9B:
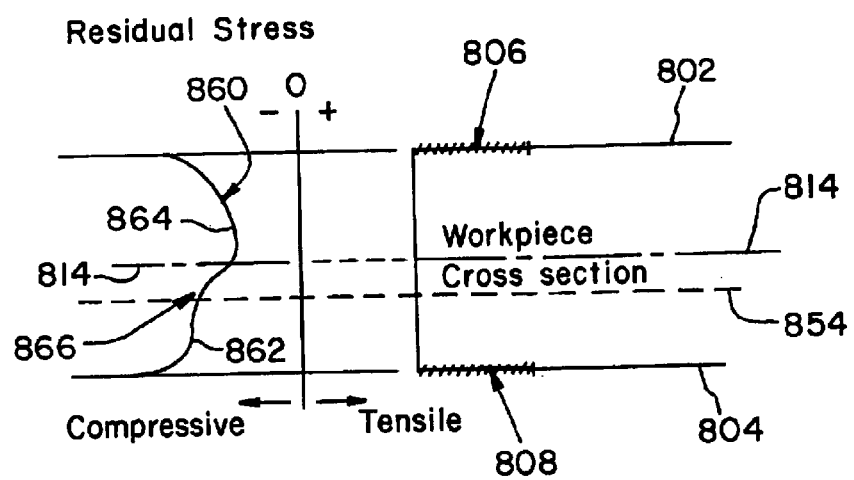
FIG. 9B is a diagrammatic representation of the compressive residual stress distribution profile pertaining to the processed workpiece of FIG. 9A.

Returning to FIG. 9A in conjunction with FIG. 9B, the result which follows from the shockwaves encountering one another at a location apart from the mid-thickness plane is the production of an asymmetrical compressive residual stress distribution through the section thickness relative to the mid-plane, as depicted by the stress distribution profile curve 860 of FIG. 9B. This graphical depiction of the stress distribution is shown juxtaposed to a schematic representation of the workpiece cross-section to facilitate an understanding of how the compressive residual stress (and tensile strain) varies with depth from the laser shock peened surface.

The shockwave interaction depicted in FIG. 9A will produce an overall stress distribution 860 resulting from the combination of stress level distributions 862 and 864 that represent the variation in compressive residual stress levels imparted by shockwaves 850, 852 propagating from laser shock peened surfaces 806 and 808, respectively and their interaction at intersection plane 854. These stress level distributions generally join at curve portion 866 defined at the shockwave intersection plane 854, producing an asymmetrical stress distribution profile curve 860 with respect to mid-plane 814. The larger plastic strain produced about the intersection plane 854 skews the compressive residual stress distribution to be higher towards the surface having the delayed pulse or shown in FIG. 9B. If the intersection plane occurs just beneath the laser shock peened surface 808, the compressive residual stress in this surface would be increased relative to the opposing surface 806.

The timing process that defines the time interval between formation of the laser shock peened surfaces on opposite sides of the workpiece is preferably selectively chosen to provide a shockwave intersection plane that coincides with a location where such shockwave synergy is desired.

Although the intersection plane is shown below the mid-plane in FIG. 9, this is for illustrative purposes only, as it should be apparent that the intersection plane can be positioned at any level relative to the mid-plane either above or below it by suitable selection of the time interval between irradiation of the opposite sides of the workpiece. For example, an intersection plane above the mid-plane would involve first laser peening lower surface 804 and then laser peening upper surface 806.

Figure 10A:
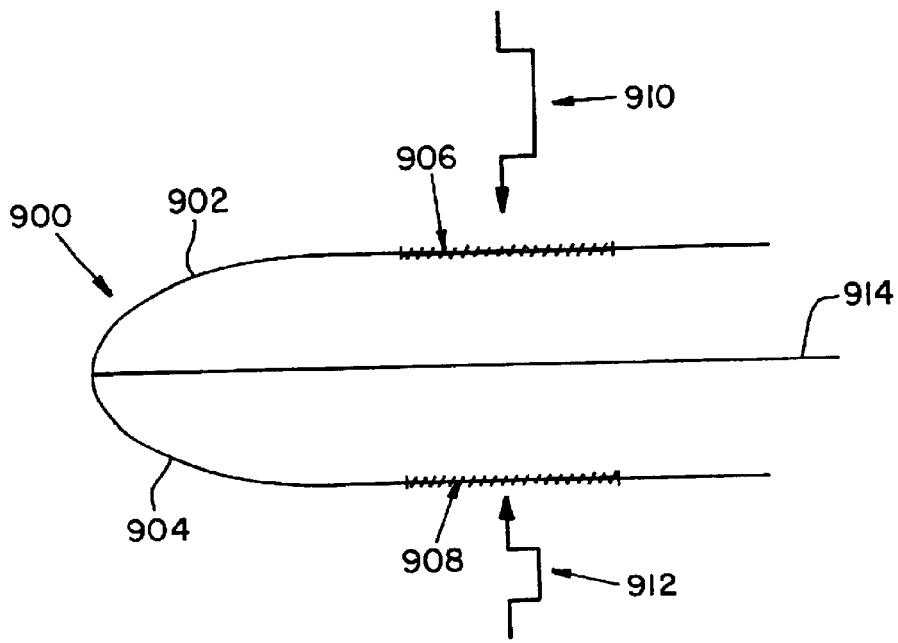
FIG. 10A is a planar cross-sectional view of a workpiece section to illustrate a dual-sided laser shock peening operation, according to a third embodiment of the present invention.

Referring next to FIG. 10A, there is shown a cross-sectional view which depicts the double-sided, simultaneous laser shock peening of a thin section using laser beams having different pulse lengths, according to the third embodiment of the present invention.

Illustrative workpiece 900 includes sides 902 and 904 disposed generally opposite one another and a mid-thickness plane 914. The opposing sides 902 and 904 are simultaneously laser shock peened with laser beams having different pulse lengths to form opposing laser shock peened surfaces 906 and 908, respectively. As shown, the laser shock peened surfaces 906 and 908 are respectively irradiated with representative laser beams 910 and 912, where the pulse length of laser beam 910 is longer than the pulse length of laser beam 912.

It is preferable that the laser shock peened surfaces 906, 908 be shaped and dimensioned identically. This requires, for example, the use of identically sized laser beam spots. Additionally, it is preferable that the laser shock peened surfaces 906, 908 be formed so as to be fully opposing one another, namely, that there is no lateral offset therebetween.

The residual stress profile through the thickness of workpiece 900 is modified due to the use of different pulse lengths for the laser beams simultaneously irradiating the opposite sides of workpiece 900. This modification arises because the shockwave generated by the shorter pulse will attenuate faster (i.e., the peak pressure will decrease faster) with distance into the material than the shockwave generated by the longer pulse at the opposite side. The effects of this modification are discussed below in connection with FIG. 10B.

Figure 10B:
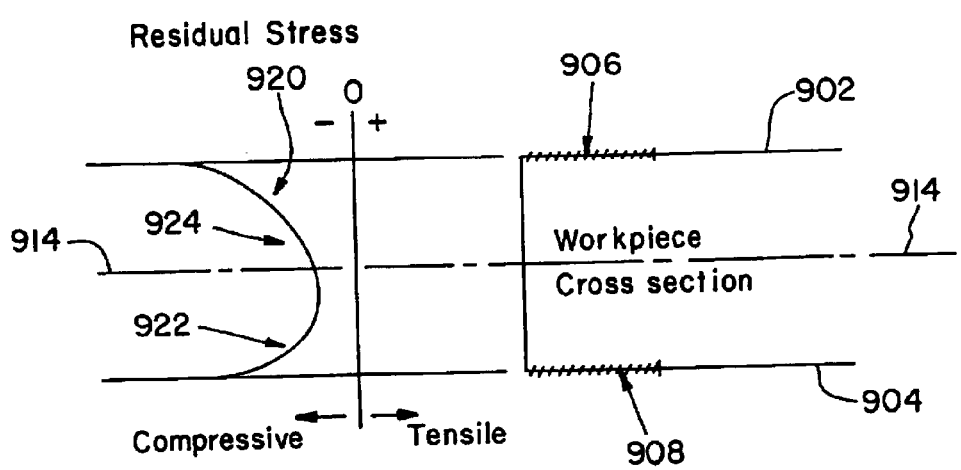
FIG. 10B is a diagrammatic representation of the compressive residual stress distribution profile pertaining to the processed workpiece of FIG. 10A.

FIG. 10B graphically illustrates the compressive residual stress distribution through the workpiece thickness relative to the mid-plane 914. This graphical depiction of the stress distribution is shown juxtaposed to a schematic representation of the workpiece cross-section to facilitate an understanding of how the compressive residual stress (and tensile strain) varies with depth from the laser shock peened surface.

Referring to the stress distribution profile curve 920, the gradient in the compressive residual stress (which decreases with increasing distance from the laser shock peened surface) will be steeper on the side affected by the shorter laser pulse, i.e., the compressive stress will not extend as far below the surface of the short pulse side as compared to the long pulse side. This steeper gradient is generally indicated by portion 922 of curve 920 corresponding to the stress distribution that relates to forming laser shock peened surface 908 with a shorter laser beam pulse. The more gradual gradient for the stress distribution associated with the longer laser beam pulse is generally indicated by portion 924 of curve 920.

As curve portion 922 indicates, the compressive residual stresses due to the shorter laser beam pulse may terminate at a location antecedent to mid-plane 914. This condition ensues from the fact that the shockwaves induced by the shorter laser beam pulse may attenuate sufficiently that the peak pressure is reduced below the HEL before reaching the mid-plane 914.

It is also seen that the interaction of the shockwaves at mid-plane 914 will be decreased by the amount that the shorter pulse has attenuated compared to the longer pulse. It is possible that the shockwave interaction at mid-plane 914 is so weak as to generate little or no plastic strain, and therefore little or no additional compressive residual stress due to the interaction. However, this asymmetry in compressive residual stress could provide a significant advantage in using this processing method to form curved thin sections or for counteracting distortion in thin sections.

Referring next to FIGS. 11 and 12, FIGS. 11A–C show a series of cross-sectional views of a workpiece section that is laser shock peened using various amounts of lateral offset between the dual-sided laser shock peened surfaces, according to the fourth embodiment of the present invention.

FIG. 11A shows a lateral offset where the laser shock peened surfaces oppose each other in part, i.e., there is a partial overlap of the lateral dimensions. FIG. 11B shows a lateral offset where the neighboring edges of the laser shock peened surfaces line up with one another, but there is no overlap. FIG. 11C shows a lateral offset where the neighboring edges of the laser shock peened surfaces are spaced-apart from one another, i.e., there is no overlap of the lateral dimensions.

Referring first to FIG. 11A, workpiece 940 is simultaneously laser shock peened at both of its opposing sides 942 and 944 using respective laser beams 946 and 948 to form respective laser shock peened surfaces 950 and 952. As shown, the laser shock peened surfaces 950 and 952 are laterally offset or displaced from one another along the lateral direction 954. Traveling shockwaves 956 and 958 induced by laser shock peening are associated with the formation of laser shock peened surfaces 950 and 952, respectively. Various effects are produced by such lateral offset relationship.

The balance of forces (manifested as metal movement) from the shockwaves moving through the thickness is not directly balanced. This imbalance exerts a moment force on the material that tends to rotate the workpiece around an axis perpendicular to the displacement vector connecting the offset laser shock peened surfaces. The force moments will act directly to deform and bend the material.

For example, referring to FIG. 12, there is shown a dual-sided laser beam peening arrangement that depicts the bending moments produced by the laser shock processing conducted in connection with FIGS. 11A–C. An illustrative set of three (3) laser beam pairs 988, 989 and 990 is shown having associated laser beams 992 and 993 applied simultaneously in the indicated lateral offset manner to respective opposite sides 942 and 944 of the workpiece.

The lateral offset among the respective laser beams of each pair is different for each of the laser beam pairs 988, 989 and 990. In particular, the lateral offset increases through laser beam pairs 988, 989 and 990. Increasing the offset between the opposing laser beams has the effect of increasing the bending moment on the thin section. Accordingly, in ascending order, the bending moments increase through laser beam pairs 988, 989 and 990. The direction of the rotary bending force induced by the bending moments is specified by the indicated arrows.

Additionally, the lateral offset relationship between the simultaneously applied incident laser beam spots also has the effect of modifying the shape and location of the shockwave interaction zone, which normally is located at mid-thickness for opposite-positioned laser beam spots. In particular, when the laser beam spots are positioned directly opposite one another across the mid-thickness plane, the shockwave interaction zone remains nominally along the mid-thickness plane, as shown in FIG. 8A.

However, when the laser beams are offset, the shockwave interaction zone has a reduced portion at mid-thickness, and will exhibit newly appearing wing-type portions that extend obliquely from the mid-thickness plane towards the workpiece surface. The portion of the intersection zone of interest for the purpose of this invention is the zone in which the combined pressure of the interacting shockwaves is higher than the HEL, in a region to have the shockwave from only over of the laser beam spots would have a pressure below the HEL. As a consequence of this local increase in pressure above the HEL, this zone will have additional plastic strain creating additional compressive residual stress. This effect will therefore introduce asymmetry into the compressive residual stress distribution through the thickness and thereby extend the field containing residual compressive stress beyond the material volume directly under the laser shock peened spot. This will effectively increase the extent of the compressive residual stresses as compared to directly opposed laser shock peened spots. In addition, this effect will produce localized bending of the thin section.

It will also be apparent that progressive increases in the lateral offset will further shorten the shockwave interaction zone at mid-thickness, while the wing-type portions of the zone will curve more obliquely outwards to the opposite surfaces. Eventually, a threshold lateral offset may be reached beyond which the shockwaves will be nominally perpendicular to the workpiece surfaces when they intersect and any bending now will be small and ineffective. However, if the combined pressure of the intersecting shockwaves is higher than HEL, plastic strain will develop and localized compressive residual stress will exist in the interaction zone.

Returning again to FIG. 11A, the mid-plane portion of the shockwave interaction zone (specified generally at 957) is generally defined by the intersection of intermediate wavefronts 960 and 962 of shockwaves 956 and 958, respectively. The wing-type portion of the shockwave interaction zone (specified generally at 959) is generally defined by the intersection of leading wavefronts 961 and 963 of shockwaves 956 and 958, respectively. The locus of the various interaction locations of the intersecting shockwaves 956 and 958 is defined generally by interaction locus curve 970.

Referring now to FIG. 11B, the lateral offset between the laser beams has been increased relative to that of FIG. 11A. As a result, the mid-plane portion of the shockwave interaction zone (specified generally at 972) has been shortened relative to the mid-plane portion 957 in FIG. 11A. Additionally, the wing-type portion of the shockwave interaction zone (specified generally at 973) is steeper and rises more sharply towards surface 942, as compared to the relatively flatter wing-type portion 959 in FIG. 11A. The locus of the various interaction locations of the intersecting shockwaves 974 and 975 is defined generally by interaction locus curve 976.

Referring now to FIG. 11C, the lateral offset between the laser beams has been increased relative to that of FIG. 11B. As a result, the mid-plane portion of the shockwave interaction zone has virtually disappeared. Additionally, the wing-type portion of the shockwave interaction zone (specified generally at 978), which almost exclusively defines the whole of the shockwave interaction zone, rises even more sharply towards surface 942, as compared to wing-type portion 973 in FIG. 11B. The locus of the various interaction locations of the intersecting shockwaves 979 and 981 is defined generally by interaction locus curve 983, which exhibits a weak residual stress overlap region.

The overlap between the compressive residual stress regions becomes progressively smaller throughout FIGS. 11A–C with an increase in lateral offset between the incident laser beams.

Figure 13:
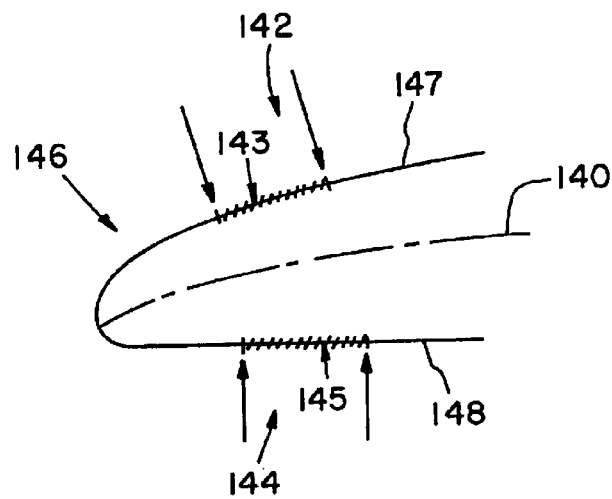
FIG. 13 is a cross-sectional schematic view of a workpiece section to illustrate the mid-thickness plane and the positioning of substantially opposite laser beam spots for a workpiece having non-parallel opposing sides.

Referring to FIG. 13, there is shown an illustration of the mid-thickness plane 140 and the positioning of substantially opposite laser beam spots 142 and 144 (producing laser shock peened surface 143 and 145) for a workpiece portion 146 having non-parallel opposite surfaces 147 and 148.

Figure 17:
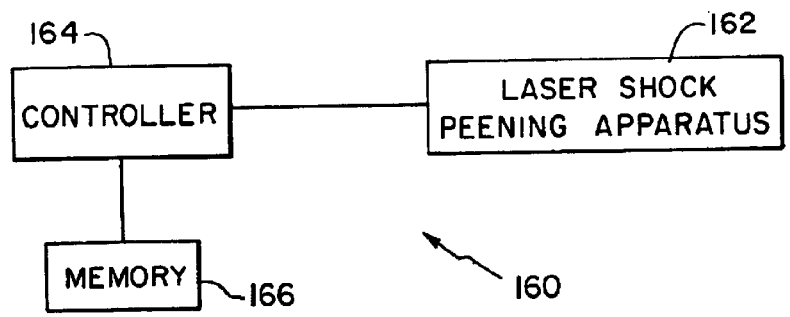
FIG. 17 is a block diagram representation of a laser shock processing system configured to practice the present invention.

Referring to FIG. 17, there is shown a simplified block diagram illustration of a system for use in practicing the present invention. In its most elemental form, the system 160 includes a laser shock peening apparatus 162 and a controller 164 for selectively controlling the operation of laser shock peening apparatus 162 in conjunction with laser shock processing a specified object.

In a preferred form, controller 164 is selectively configurable to enable any type of laser shock operating sequence to be performed. For example, when controller 164 has a computer or microprocessor-based implementation, a suitable program code of instructions may be loaded into memory 166 and transferred to controller 164 for execution. The program code would fully define the series of control commands and instructions needed to execute, govern, and manage a corresponding laser shock processing operation as carried out by laser shock peening apparatus 162.

A suitable user input device (not shows) may be optionally added to enable a user to input or change various operating parameters.

What has been shown and described herein are various laser shock processing sequences suitable for allowing a designer to design tailored or customized compressive residual stress distribution profiles in target workpieces.

For example, multiple neighboring spots may be selectively located on the same area of the workpiece surface in a simultaneous manner to enhance the laser peening effect, i.e., to increase the depth of the compressive residual stress.

Additionally, it is possible to vary the time interval (for example, within a range of less than one microsecond) between irradiation of multiple spots on opposite sides of a thin sections, there controlling the location (relative to mid-plane) where the shockwaves meet.

Moreover, different pulse lengths of the laser beams that irradiate opposite sides of a thin section will control the depth to which residual compressive stresses will extend below the processed surface. It also will determine the extent to which the shockwaves will interact at mid-thickness, e.g., the shockwaves generated by shorter laser pulses will attenuate much more rapidly with distance from the processed surface, as compared to longer pulses. Shorter pulses will therefore considerably weaken the shockwave interaction at mid-thickness and reduce mid-thickness compressive residual stresses, and increase the compressive stress gradient below the laser shock peened spot.

These methods may also be used to modify the shape of thin metal sections, such as by forming a processed section into gently curved shapes.

These methods also introduce an asymmetric residual stress distribution that may cause the thin section to curve inward towards the side having the less compressive stress. For example, in FIG. 9B, the thin section would being to curve concave upward as the compressive stresses and the laser peened area increased. In this way, by controlling the laser peening intensity and area of coverage, a desirable, controlled curvature of the thin section could be produced.

Finally, the neighboring beam concept could also be used in double-sided laser peening of thicker, thin sections to promote through-thickness compressive residual stresses that are present deeper into the material than would be possible using only a single beam on each side. The neighboring beam approach could also significantly enhance tangential compressive residual stresses around holes, further inhibiting crack initiation from the hole surface. This would happen because the intersecting planes would be radial to the hole, so that the major orientation of the compressive stress would be tangential to the hole, the most favorable compressive stress orientation, as shown in FIG. 7.

To further explain portions of the invention, FIGS. 18 and 19 are provided. FIGS. 18A–E are figures in time sequence that show that with double sided laser shock processing when both laser pulses arrive at the opposing surfaces at the same time, the compression waves go through the workpiece and reflect off the opposite sides. When tensile waves travel back into the material, the waves meet at the mid-thickness of the workpiece or in that vicinity, and a very large increase in the tensile stress occurs in that region. If the material has low ductility, cracking can develop at that point, which is undesirable. The invention in one form, provides a means to minimize or eliminate a potential tensile wave interaction.

In FIGS. 18A–F, the Y axis measures pressure. The X axis is (on the left) distance to the left of the vertical line, it is distance into the material from the surface (surface 2), and to the right of the line, is the free surface. The negative X side shows the shockwave traveling from the opposing surface (surface 1). The position X side shows the shockwave being applied to the surface by the laser beam at the same instant.

Figure 18A:
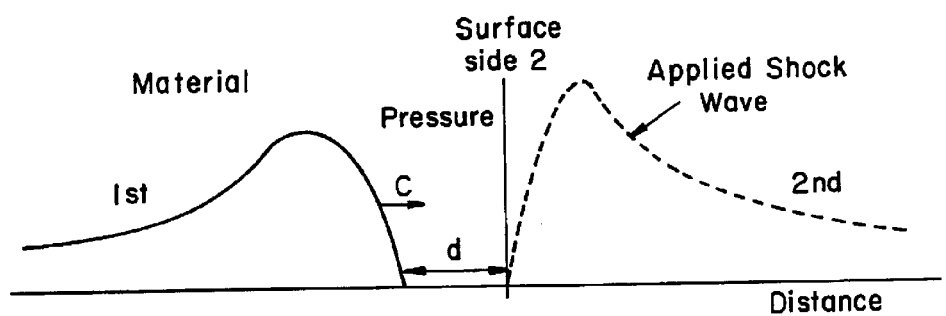
FIGS. 18A–F show examples of shockwaves passive through a workpiece with no tensile wave interaction.
Figure 18B:
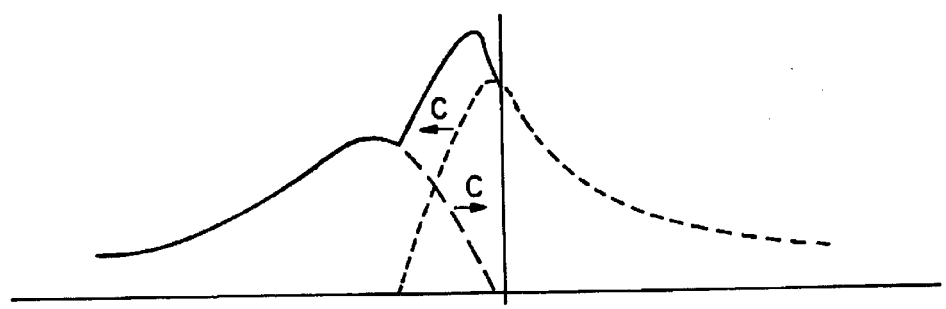
Figure 18C:
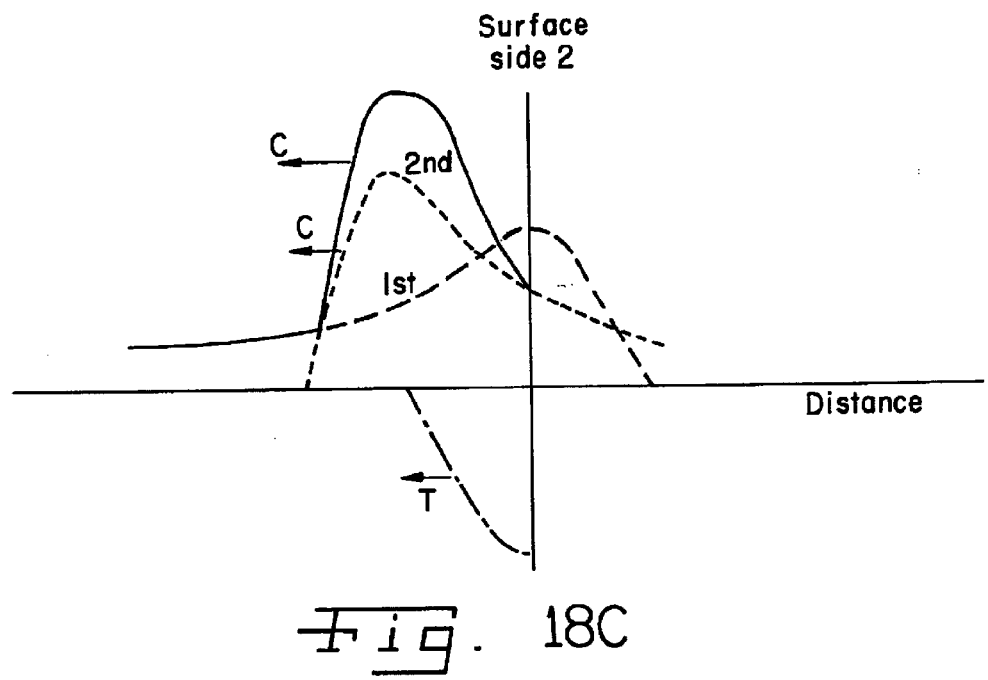

In FIG. 18A, an in-material shockwave is shown approaching the free surface from the opposing surface, and a laser impulse is timed on the near surface to be initiated when the stress wave in the material is approaching that surface. The first shockwave (shockwave 1) is a solid line and the second shockwave (shockwave 2) to be applied is the dash line. In FIG. 18B, the first shockwave has just reached the surface and the second shockwave has already passed some distance into the surface and the solid line shows the actual pressure profile within the material from the superposition or interaction of the two. A beginning increase in the compression wave is shown higher than either of the shockwaves. In FIG. 18C, (another next time interval) shows a point in time when the first shockwave has begun to reflect off the opposing surface as a tensile wave which is shown below the line in the figure, coming back into the material. Reflected shockwave 1 (T1) is the dotted dash line underneath the X axis, in the negative pressure portion quadrant. The second shockwave has traveled further into the material during that same time interval and the solid line now displays the combination. The solid line is the actual pressure profile that results in the combination of the three components of the shockwaves that are within the material (e.g., shockwave number 1, shockwave number 2, and reflected tensile shockwave number 1 (T1)). The increase in the peak pressure at surface 2 will increase the magnitude and possible the depth of the compressive stress at surface 2.

Figure 18D:
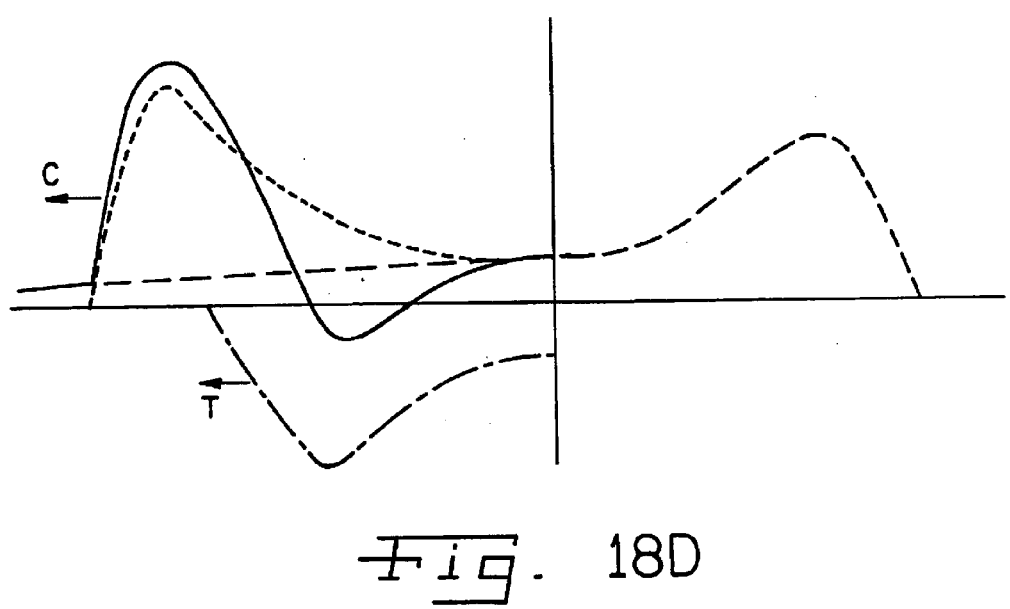

FIG. 18D shows another time interval where T1 has progressed to a much greater degree and shockwave number 1 has basically reflected in large part off the opposing surface as a tensile wave with just a long compressive tail, that is still traveling towards the opposing surface, and shockwave number 2 has progressed substantially into the material. The solid line again shows the superposition effect of those three waves and demonstrates that one has a significant compression wave traveling into the material followed by a small tensile wave, its magnitude depending on the amount of attenuation that has already occurred in shockwave number 1 as it has gone through the material and reflected off the opposite surface.

Figure 18E:
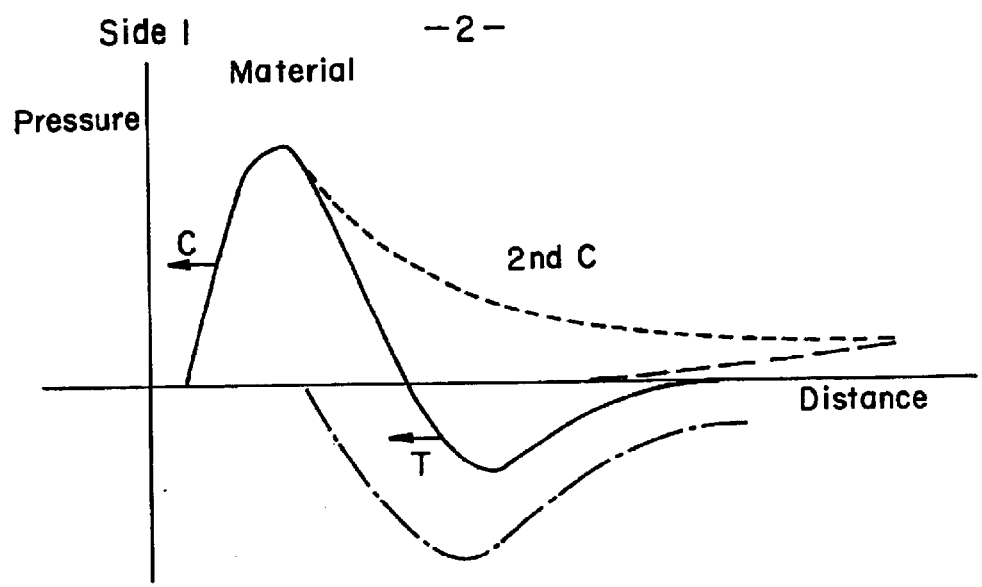
Figure 18F:
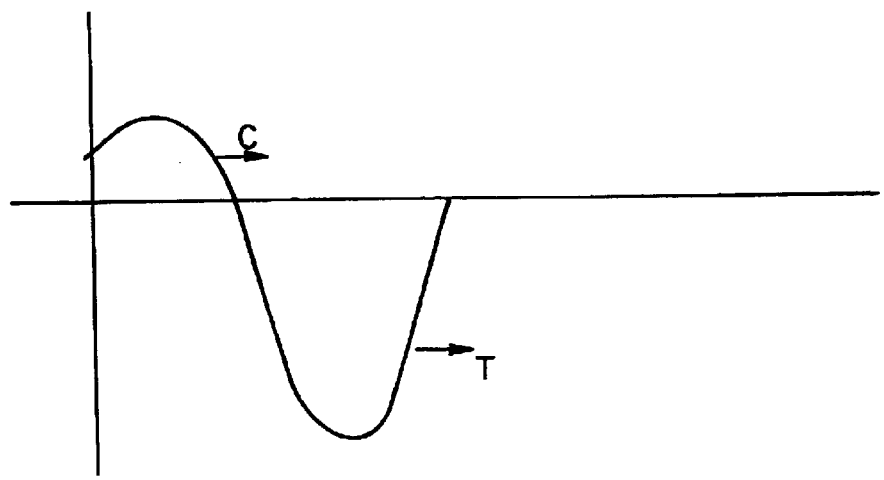

FIG. 18E shows the same wave approaching the opposing surface (surface 1). Once the components separate from shockwave 1, out of the combination of the compressive shockwave 2 plus the compressive tensile shockwave 1, one has a compression wave with a following small tensile wave. Then, when such wave reflects from the surface as shown in FIG. 18F, then just a normal tensile reflective wave followed by a small compression wave exists. Thereby one does not get doubling of the tensile waves of the combination of the tensile reflective waves from the two opposing shockwaves. The end result is that one obtains compressive residual stresses on each surface, without getting the negative effect of the opposing shock or the tensile reflected waves of the opposing shockwave adding somewhere in the material and potentially causing cracking. In FIG. 18E the solid line again is the superposition or combination of the entire amount of force that it is traveling through the workpiece. The solid line clearly shows that the length of the combined shockwave is shorter than shockwave 2 would be without the interaction at surface 2. This will increase the rate of attenuation of the peak pressure and reduce or eliminate its effect on the preexisting residual stress when it reduces surface 1.

An important point in FIG. 18, is that shockwave 1 and shockwave 2 in FIG. 18A are not the same height because allowance has been made, and in the real world in made in fact, that in the time shockwave 1 approaches the opposing surface, there will be some attenuation at the peak pressure and some broadening of the pressure curve. This is illustrated by the difference in heights and slight difference in shape between the two. Therefore, there is no automatic match of the pressure waves if the applied beams are the same.

FIG. 19 illustrates double sided processing of thin surfaces or thin sections, where it is possible to achieve compressive residual stresses on one side without developing compressive residual stresses on the opposite side while conducting two sided laser peening. FIG. 19A shows a compressive wave passing through the material approaching the interior surface on side 2, e.g., a compression wave 1 from laser shot peening 1, and the dotted line the compression wave for shot 2. The key aspect shown is that the shockwave 2 initiates at the time or nominally at the same time that shockwave 1 strikes the surface (side 2). Therefore there is a difference in terms of the timing relative to the initiation of pressure pulse 2 at side 2 between FIGS. 18A and 19A.

Figure 19A:
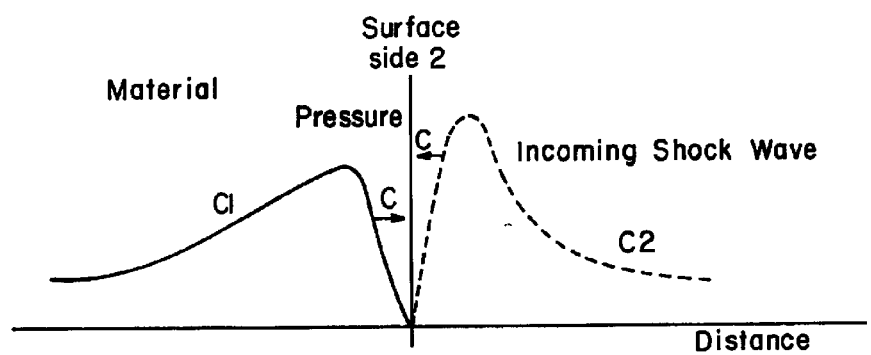
FIGS. 19A–E show examples of shockwaves interacting.
Figure 19B:
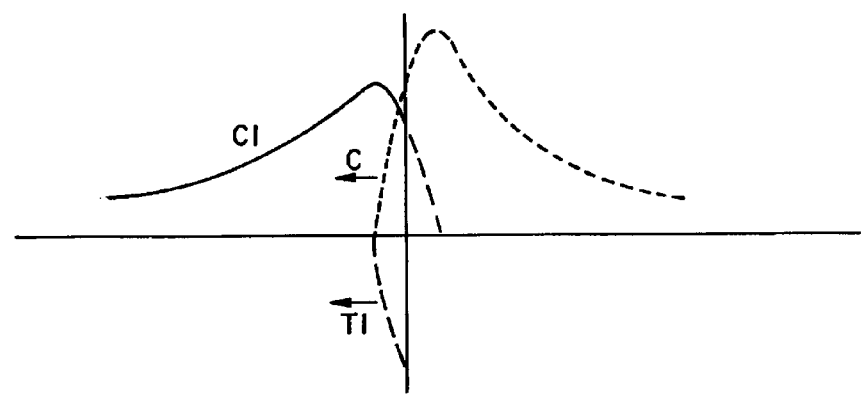
Figure 19C:
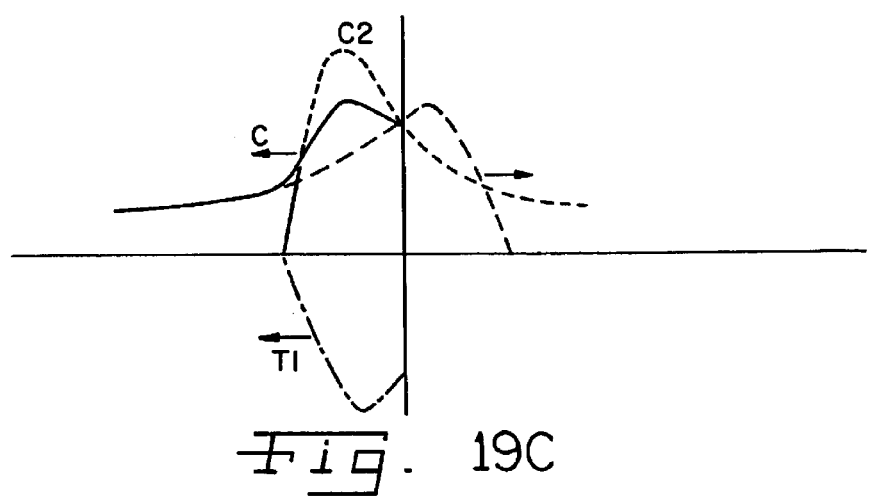

FIG. 19B shows (a short time later) when shockwave 1 is beginning to reflect off of side 2 and forming a tensile reflective wave T1. Shockwave 2 has just entered into the material. The composite or the combination fo these three components, shockwave 1, shockwave 2, and tensile reflective wave 1, is shown as the solid line, the actual pressure profile within the material. Note that there is a slight increase in compressive stress just inside the surface. FIG. 19C shows additional time has passed, and the peak of shockwave 1 has now reflected as a tensile wave, tensile wave 1, back into the material and the peak of shockwave 2 has passed into the material. The solid line shows the combination fo those three shockwaves. One can see that the peak pressure has now been diminished as shockwave 2 passes into the material. It is basically still on the tail of shockwave 1 passing through the material.

Figure 19D:
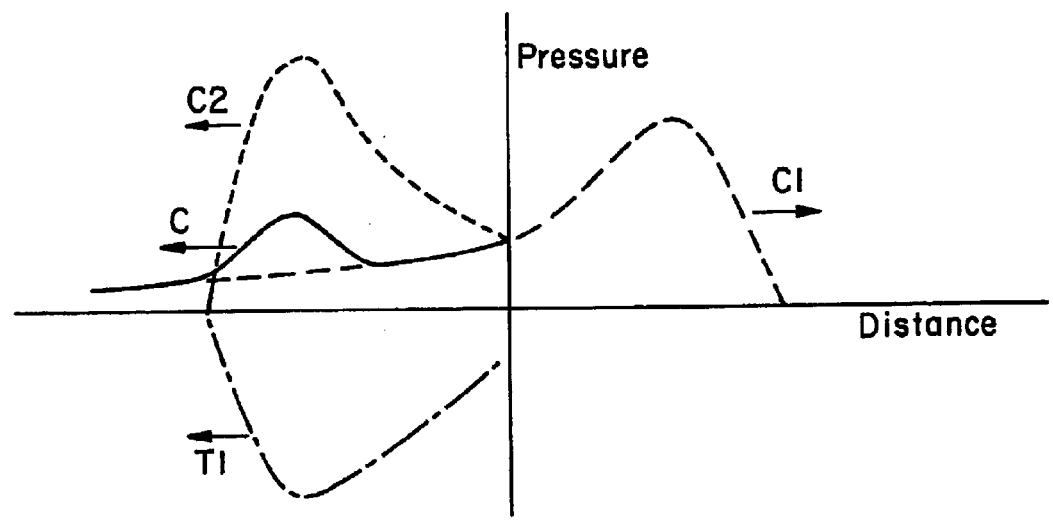
Figure 19E:
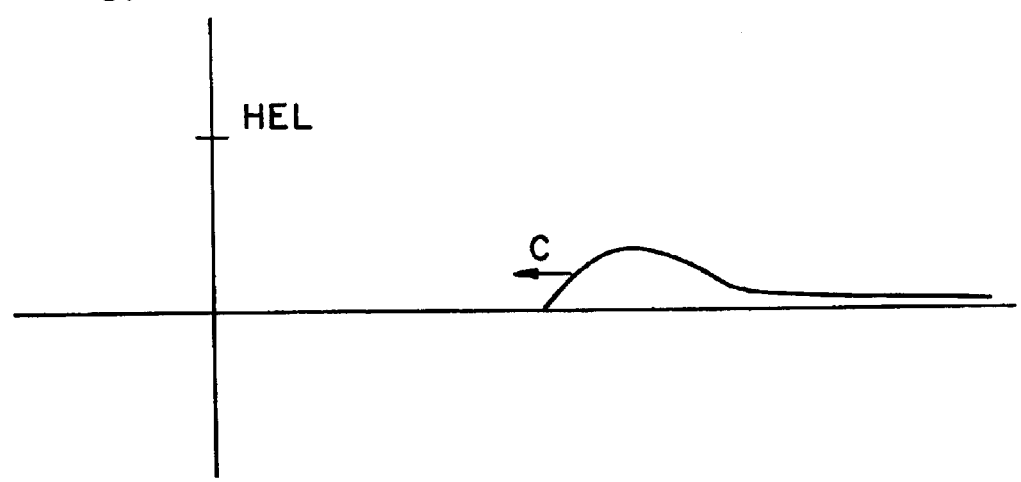

FIG. 19D shows a later delta time where shockwave 1 has passed mostly into the material and the tensile reflected wave of shockwave 1 is very nearly compensating for shockwave 2 so that the combination pressure of the three different components of the shockwave is a very low compressive residual stress and could be selected to be below the elastic limit of the material where it would not be developing additional plastic strain and contributing to the compressive residual stress. There may be some compressive residual stress at side 2, but not nearly to the extent that would occur without the relative timing of the shockwaves as discussed above, because one is diminishing the peak pressure of shockwave 2 as shown in FIG. 19C.

If the pressure is above the HEL limit for the material, then one will obtain dynamic yielding in plastic strain. The plastic strain will then be the source of the residual compressive stress. If the pressure is below the HEL, then one will not obtain yielding and plastic strain will not develop. Therefore no compressive residual stress will be created. It is the plastic strain int eh material that is the source of the compressive residual stress.

In FIG. 19, therefore, with the timing mismatched, with a particular timing, the sum of the pressures does not reach the HEL limit or there is less that is reaching the limit, and thereby reducing or eliminating the magnitude of the compressive residual stress at the surface. FIGS. 19D and 19E show a later time period. FIG. 19E shows the combined shockwave approaching side 1 and one can see that it is a very low magnitude compressive shockwave. This wave is what would be intended to be well below the HEL and would have no effect on the opposing surface. In essence what is shown between FIGS. 18 and 19 is that to place the highest amount of largest amount of compressive residual stresses and the deepest into the material, one would want to have some type of particular timing, between the first shot while it is in the material to when one applies or creates a second shot at the opposing surface of the material. So there would be some distance which would equal to some time between the two that D would be dependent upon the material.

In addition to the concepts explained above, what one can also accomplish is to adjust the magnitude of the intensity of laser pulse 2 compared to laser pulse 1 to further and contribute to decreasing the peak pressure. Therefore, instead of coming in at that same magnitude laser beams one could come in at a smaller magnitude. Therefore, the inventive system not only modifies the timing, but can also modify the relative intensities of the two pulses. In FIG. 19 the attempt is to develop a higher compressive residual stress no one side than the other side. However, in thin sections one can also obtain a significant deformation of the workpiece. What is shown is by applying a laser pulse from the opposite side, a minimizing of the distortion occurs since the system is sending in a compensating shockwave in the other direction. If everything is equal (as in conventional split beam processing) and the workpiece is equal distant away from the optics, and for example, the beams are coming in together at a midpoint, one would not want the workpiece at the midpoint between the place where the laser beams would actually cross or meet in the first instance. A physical setup for the effect of FIG. 19 could be accomplished by inserting (in conventional split beam processing) an appropriate difference in the beam path lengths to allow the one beam to arrive at a desired amount later than the other beam. In that case, one would be setting the workpiece and aligning it in the center and just change one beam path versus the opposite side beam path to have a longer length. So if it was needed to adjust the timing, in terms of a nanosecond or 5 nanoseconds, one would add in one or five additional feet of beam travel length with everything else still being centered. If relatively long delays between the two shockwaves were needed, i.e., approaching 1 microsecond, one would preferably use lasers with separate oscillators and then initiate either beam with the desired delay time. The delay time would depend on the material thickness. The time to travel through the material would be H over C as a time difference int eh beams of 5 to 20 nanoseconds depending on the pulse, probably in the range of 5 to 50 nanoseconds. The invention in this form prevents the reflected tensile waves from interfering between themselves.

Figure 20:
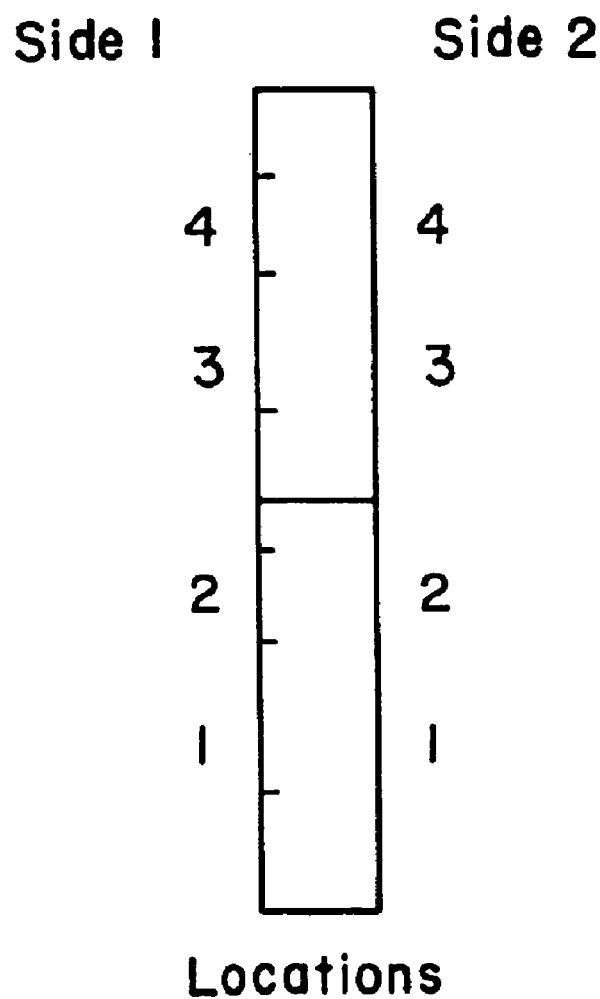
FIG. 20 is a new processing pattern for thin section workpieces.

In another embodiment, the center line cracking of workpieces may be avoided by alternate side processing where one avoids tensile stress wave interaction altogether by a longer delay between them. For example, FIG. 20 shows a drawing of a thin section having beam locations 1, 2, 3, and 4 on both side 1 and side 2. The novel example pattern foreseen is laser processing one side 1 location 1 and then after the shockwave traverses and rings out (e.g., self-attenuates within the part), side 2 location 2 is hit and rings out, and then side 1 location 3, then side 2 location 5 and then so on going on to n length. At a later time, processing would start with side 2 location 1, letting it ring out, then side 1 location 2 letting it ring and then continuing on again to side 2 location 2 and so forth with the pattern.

An additional thin section processing pattern could be side 1, spot 1 let it ring out, side 2, spot 1 let it ring out, side 1, spot 2 let it ring out, side 2, spot 2 let it ring out to spot n. Although the spots would typically co-align, the spots do no necessarily have to be aligned to avoid centerline cracking.

A calculation is possible to the kind of delay one would want for the shockwaves meeting off the mid-plane, and in this case, one would have a similar calculation relative to the intersection or midpoint between the spots. Five mm or less is a preferred spot separation because of the decay of the shockwaves in most metal workpieces.

In some embodiments (same side processing) a maximum delay time required, based on a maximum and preferred separation of 5 mm, is that distance (5 mm) divided by the sound speed within the material processed to give the number of nanoseconds of maximum delay. In other words, the maximum delay between the spots is the distance between the spots divided by the shockwave speed in that particular material, and that maximum delay, is the maximum delay allowed to have the effects. If one exceeds that delay time, shockwave two would be passing in material through which the shockwave one has already passed, and the workpiece therefore would have missed the interaction.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method, comprising the steps of:
providing an object; and
laser shock peening said object to form at least one set of at least two simultaneously formed, non-overlapping adjacent laser shock peened surfaces.

2. The method as recited in claim 1, wherein the laser shock peening step further comprises the steps of:
forming a selective laser beam spot pattern on said object sufficient to enable the formation of an overlapping region having compressive residual stress imparted by laser shock peening, said region extending into said object from a said respective laser shock peened surface.

3. The method as recited in claim 1, wherein the laser shock peening step further comprises the steps of:
forming a selective laser beam spot pattern on said object sufficient to enable at least two respective shockwaves induced by laser shock peening in connection with the simultaneous formation of at least two respective non-overlapping adjacent laser shock peened surfaces to encounter one another within said object.

4. The method as recited in claim 1, wherein the laser shock peening step further comprises the steps of:
forming a selective laser beam spot pattern on said object, the spot pattern being configured to effectuate the formation of at least one row of spaced-apart shockwave intersection sites in said object, each shockwave intersection site being defined by an encounter between shockwaves induced by laser shock peening, traveling from neighboring spaced-apart laser beam spots.

5. The method as recited in claim 4, wherein each row of the spot pattern comprises an alternating sequence of shockwave intersection sites and spot overlap sites, each spot overlap site being defined by an overlap between neighboring laser beam spots.

6. The method as recited in claim 1, wherein the laser shock peening step further comprises the steps of:
forming a selective laser beam spot pattern on said object including at least one row of laser beam spots arranged in spaced-apart overlapping pairs, the spatial relationship between adjacent pairs being sufficient to enable the formation of a shockwave intersection site disposed at least in part therebetween, each shockwave intersection site being defined by an encounter between shockwaves induced by laser shock peening traveling from nearest neighbor laser beam spots of adjacent laser beam spot pairs.

7. The method as recited in claim 1, wherein the laser shock peening step further comprises the steps of:
forming a selective laser beam spot pattern on said object including at least one row of non-overlapping laser beam spots configured to define a selective pattern of shockwave intersection sites, each shockwave intersection site being defined by an encounter between shockwaves induced by laser shock peening traveling from neighboring laser beam spots.

8. The method as recited in claim 1, wherein the laser shock peening step further comprises the steps of:
forming a selective laser beam spot pattern on said object including at least one row of overlapping laser beam spots, the spot pattern being configured to effectuate the formation of at least one row of shockwave intersection sites in said object, each row of shockwave intersection sites being generally disposed between respective adjacent ones of the laser beam spot rows, each shockwave intersection site being defined by an encounter between shockwaves induced by laser shock peening traveling from laser beam spots of adjacent non-overlapping rows.

9. The method as recited in claim 1, wherein the laser shock peening step further comprises the steps of:
sequentially forming at least one selective laser beam spot pattern on said object, each pattern being configured to effectuate the formation of at least one row of shockwave intersection sites in said object, each shockwave intersection site being defined by an encounter between shockwaves induced by laser shock peening traveling from neighboring laser beam spots.

10. The method as recited in claim 9, wherein each row of shockwave intersection sites associated with a respective laser beam spot pattern being associated with a respective orientation characteristic defining a directional orientation of the shockwave intersection sites associated therewith.

11. The method as recited in claim 1, wherein said object includes an airfoil.

12. The method as recited in claim 1, wherein said object includes a gas turbine engine component.

13. A method, comprising the steps of:
providing an object; and
laser shock peening said object to form at least one set of at least two non-overlapping adjacent laser shock peened surfaces simultaneously formed with one another, each laser shock peened surface being associated with a respective shockwave induced by laser shock peening;
wherein the respective shockwaves associated with at least one selective set of at least two simultaneously formed, non-overlapping adjacent laser shock peened surfaces encounter one another within said object.

14. A method, comprising the steps of:
providing an object; and
simultaneously laser shock peening said object at a plurality of locations to form at least one pair of adjacent, spaced-apart laser shock peened surfaces on said object and to induce the generation of a respective shockwave in association with the formation of each laser shock peened surface, wherein the respective spaced-apart relationship between the respective laser shock peened surfaces of at least one respective laser shock peened surface pair being sufficient to enable the respective shockwaves associated therewith to encounter one another within said object.

15. A method, comprising the steps of:

providing an object;

laser shock peening said object to form at least one set of at least two simultaneously formed, adjacent laser shock peened surfaces, each laser shock peened surface being associated with a region of compressive residual stresses extending into said object therefrom and imparted by laser shock peening; and configuring the laser shock peening operation to enable the formation of at least one region overlap location, each region overlap location being formed by the encounter between the shockwaves associated with at least two corresponding simultaneously formed, non-overlapping adjacent laser shock peened surfaces.

16. The method as recited in claim 15, wherein the configuration step further includes the steps of:

selecting a predetermined non-overlapping relationship for use in forming neighboring ones of the laser shock peened surfaces.

17. A method for use with an object, comprising the steps of:

providing a laser shock processor; and operating said laser shock processor to laser shock process said object in a manner sufficient to cause at least one set of at least two shockwaves having mutually non-interfering initial wavefronts to develop simultaneously at a selective side of said object and subsequently interact with one another within said object.

18. The method as recited in claim 17, wherein the step of operating said laser shock processor, in respect of the simultaneous development of each respective set of at least two shockwaves having mutually non-interfering initial wavefronts, comprises the steps of:

simultaneously forming two non-overlapping laser shock processed surfaces on said object.

19. The method as recited in claim 18, wherein at least two simultaneously formed laser shock processed surfaces having a spatial separation of less than about 5 mm.

20. A method, comprising the steps of:

providing an object having a first side and a second side disposed generally opposite one another; and simultaneously laser shock peening said object at the first and second sides thereof to form first and second laser shock peened surfaces at the first and second sides of said object, respectively, wherein the first and second laser shock peened surfaces having a lateral displacement therebetween.

21. A method for use with an object having a first side and a second side generally opposing one another, said method comprising the steps of:

providing a laser shock processing apparatus; and operating said laser shock processing apparatus to laser shock process said object in a manner sufficient to produce at least one zone of compressive residual stress in said object being characterized by an asymmetrical stress distribution profile relative to a reference plane.

22. The method as recited in claim 21, wherein the step of operating said laser shock processing apparatus further comprises the steps of:

laser shock peening said object at the first and second sides thereof at different times to form opposing first and second laser shock peened surfaces disposed at the first and second sides of said object, respectively.

23. The method as recited in claim 21, wherein the step of operating said laser shock processing apparatus further comprises the steps of:

simultaneously laser shock peening said object at the first and second sides thereof using laser beams having different pulse lengths to form opposing first and second laser shock peened surfaces disposed at the first and second sides of said object, respectively.

24. The method as recited in claim 21, wherein the step of operating said laser shock processing apparatus further comprises the steps of:

simultaneously laser shock peening said object at the first and second sides thereof to form laterally offset first and second laser shock peened surfaces disposed at the first and second sides of said object, respectively.

25. A method, comprising the steps of:

providing an object having a first side and a second side generally opposing one another; and causing the formation in said object of at least one asymmetrical compressive residual stress distribution profile imparted by suitable laser shock processing of said object, each asymmetrical compressive residual stress distribution profile appearing generally along a respective thickness dimension of said object.

26. The method as recited in claim 25, wherein the causation step further comprises the steps of:

laser shock peening said object at the first and second sides thereof at different times to form opposing first and second laser shock peened surfaces disposed at the first and second sides of said object, respectively.

27. The method as recited in claim 25, wherein the causation step further comprises the steps of:

simultaneously laser shock peening said object at the first and second sides thereof using laser beams having different pulse lengths to form opposing first and second laser shock peened surfaces disposed at the first and second sides of said object, respectively.

28. The method as recited in claim 25, wherein the causation step further comprises the steps of:

simultaneously laser shock peening said object at the first and second sides thereof to form laterally offset first and second laser shock peened surfaces disposed at the first and second sides of said object, respectively.

29. A method, comprising the steps of:

providing an object; and laser shock peening said object to form at least one set of at least two formed non-overlapping adjacent laser shock peened surfaces having a spacing distance equal to or less than 5 mm from each other and having a maximum time between forming of equal to or less than the spacing distance divided by shockwave velocity in the object.

30. A method, comprising the steps of:

providing an object; and laser shock peening said object to form at least one set of at least two formed laser shock peened surfaces each having a center, the spacing distance between said centers a distance equal to or less than 5 mm from each other and having a maximum time between forming of equal to or less than the spacing distance divided by shockwave velocity in the object.

* * * * *